(12) United States Patent
Hwang et al.

(10) Patent No.: US 12,476,762 B2
(45) Date of Patent: Nov. 18, 2025

(54) METHOD AND DEVICE FOR MANAGING RESOURCE POOL IN NR V2X

(71) Applicant: LG Electronics Inc., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 405 days.

(21) Appl. No.: 18/011,414

(22) PCT Filed: Jun. 4, 2021

(86) PCT No.: PCT/KR2021/006987
§ 371 (c)(1),
(2) Date: Dec. 19, 2022

(87) PCT Pub. No.: WO2021/261800
PCT Pub. Date: Dec. 30, 2021

(65) Prior Publication Data
US 2023/0308245 A1  Sep. 28, 2023

(30) Foreign Application Priority Data

Jun. 22, 2020 (KR) .................. 10-2020-0076049
Sep. 10, 2020 (KR) .................. 10-2020-0116081
Sep. 21, 2020 (KR) .................. 10-2020-0121312

(51) Int. Cl.
*H04L 5/00* (2006.01)
*H04L 1/1812* (2023.01)
(Continued)

(52) U.S. Cl.
CPC .......... *H04L 5/0055* (2013.01); *H04L 1/1812* (2013.01); *H04W 72/0446* (2013.01); *H04W 72/25* (2023.01); *H04W 92/18* (2013.01)

(58) Field of Classification Search
CPC ... H04L 5/0055; H04L 1/1812; H04L 5/0092; H04L 1/1864; H04L 1/1861;
(Continued)

(56) References Cited

U.S. PATENT DOCUMENTS

2020/0022089 A1\* 1/2020 Guo .................... H04W 52/242
2022/0210768 A1\* 6/2022 Zhou .................... H04W 72/20

FOREIGN PATENT DOCUMENTS

WO    WO2020096435    5/2020

OTHER PUBLICATIONS

ITL, "Physical layer procedure for NR V2X," R1-1905101, Presented at 3GPP TSG RAN WG1 #96bis, Xi'an, China, Apr. 8-12, 2019, 4 pages.
(Continued)

*Primary Examiner* — Rina C Pancholi
(74) *Attorney, Agent, or Firm* — Fish & Richardson P.C.

(57) ABSTRACT

A method for a first device to perform sidelink communication includes transmitting PSCCH(s) to at least one device; transmitting data to the at least one device through PSSCH(s) related to the PSCCH(s); determining PSFCH resources for receiving sidelink HARQ feedbacks related to the data based on an index of a slot related to the PSSCH(s) and an index of a subchannel; and receiving HARQ feedback(s) related to the data from the at least one device based on at least one PSFCH resource among the PSFCH resources, wherein the PSCCH(s) and the PSSCH(s) are transmitted to the at least one device based on first resource pool(s) for transmission, the PSFCH resources are determined within second resource pool(s) for reception, and connection information between the first resource pool(s) and the second resource pool(s) may be set in the first device.

10 Claims, 19 Drawing Sheets

(51) Int. Cl.
*H04W 72/0446* (2023.01)
*H04W 72/25* (2023.01)
*H04W 92/18* (2009.01)

(58) Field of Classification Search
CPC ... H04L 5/0044; H04L 5/0048; H04L 5/0053; H04W 72/0446; H04W 72/25; H04W 92/18; H04W 4/40; H04W 72/0453; H04W 72/1263; H04W 72/53
See application file for complete search history.

(56) References Cited

OTHER PUBLICATIONS

LG Electronics, "Discussion on physical layer procedures for NR sidelink," R1-1905443, Presented at 3GPP TSG RAN WG1 Meeting #96bis, Xi'an, China, Apr. 8-12, 2019, 12 pages.

Qualcomm Incorporated, "Physical Layer Procedures for Sidelink," R1-2000966, Presented at 3GPP TSG RAN WG1 #100-e, Feb. 24-Mar. 6, 2020, 9 pages.

Samsung, "Corrections on Sidelink," R1-2005142, Presented at 3GPP TSG-RAN WG1 Meeting #101-e, e-Meeting, May 25-Jun. 5, 2020, 21 pages.

Huawei, HiSilicon, "Sidelink physical layer procedures for NR V2X," R1-1911887, 3GPP TSG RAN WG1 Meeting #99, Reno, USA, Nov. 18-22, 2019, 30 pages.

Office Action in Korean Appln. No. 10-2022-7045284, mailed on Mar. 18, 2025, 10 pages (with English translation).

Samsung, "On physical layer structures for NR V2X," R1-1902273, 3GPP TSG RAN WG1 #96, Athens, Greece, Feb. 25-Mar. 1, 2019, 10 pages.

Vivo, "Physical layer structure for NR sidelink," R1-1912020, 3GPP TSG RAN WG1 #99 Meeting, Reno, USA, Nov. 18-22, 2019, 20 pages.

\* cited by examiner

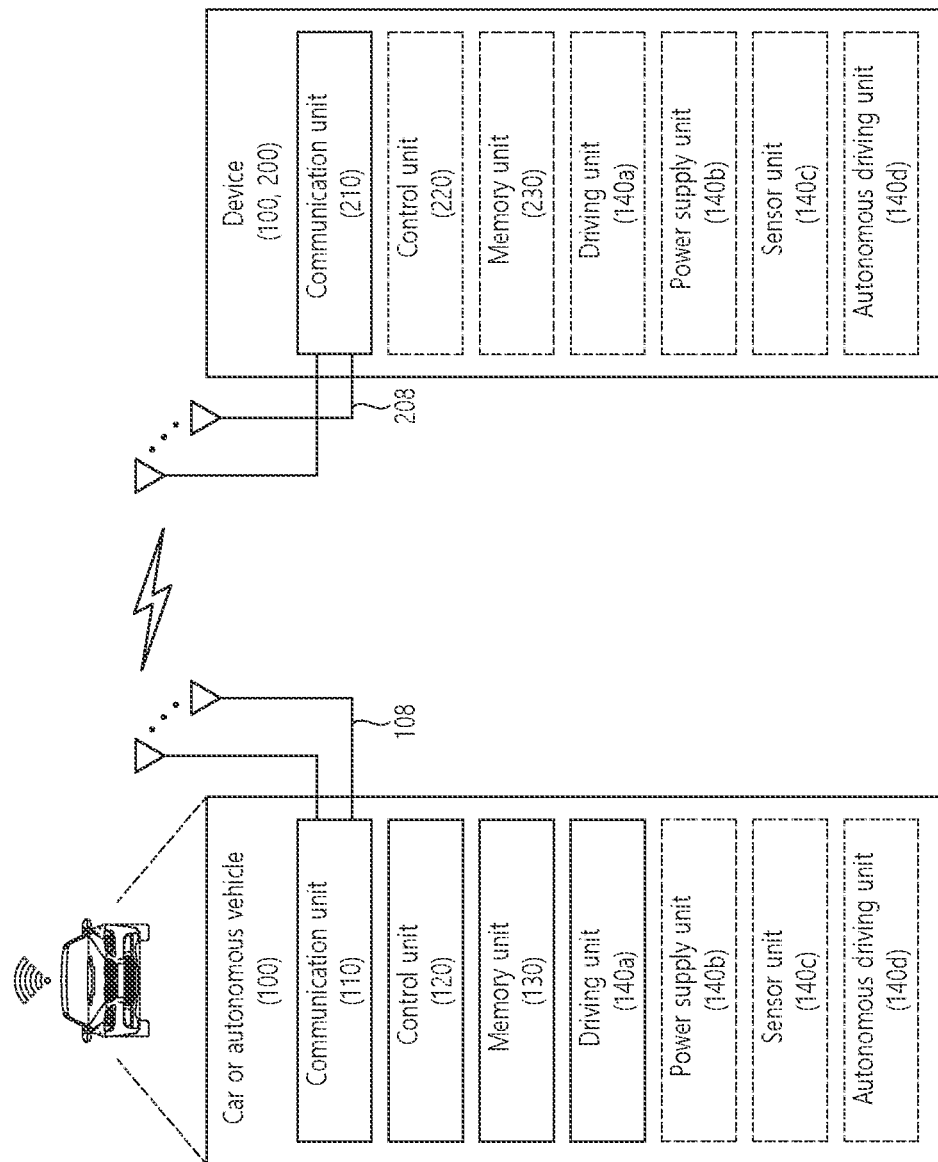

METHOD AND DEVICE FOR MANAGING RESOURCE POOL IN NR V2X

CROSS-REFERENCE TO RELATED APPLICATIONS

This application is a National Stage application under 35 U.S.C. § 371 of International Application No. PCT/KR2021/006987, filed on Jun. 4, 2021, which claims the benefit of Korean Patent Application No. 10-2020-0076049, filed on Jun. 22, 2020, Korean Patent Application No. 10-2020-0116081, filed on Sep. 10, 2020, and Korean Patent Application No. 10-2020-0121312, filed on Sep. 21, 2020. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

An object of the present disclosure is to provide a sidelink (SL) communication method between devices (or UEs) and a device (or UE) performing the same.

Another technical problem of the present disclosure is to provide a method for managing a resource pool in NR V2X and a device (or UE) performing the same.

According to an embodiment or the present disclosure, a method for performing, by a first device, sidelink communication may be proposed. The method may comprise: transmitting, to at least one device, at least one physical sidelink control channel (PSCCH); transmitting, to the at least one device, data through at least one physical sidelink shared channel (PSSCH) related to the at least one PSCCH; determining a plurality of physical sidelink feedback channel (PSFCH) resources for receiving a plurality of sidelink hybrid automatic repeat request (HARQ) feedbacks related to the data, based on an index of a slot related to the at least one PSSCH and an index of a subchannel; and receiving, from the at least one device, at least one HARQ feedback related to the data based on at least one PSFCH resource among the plurality of PSFCH resources, wherein the at least one PSCCH and the at least one PSSCH may be transmitted to the at least one device based on at least one first resource pool for a transmission, wherein the plurality of PSFCH resources may be determined within at least one second resource pool for a reception, and wherein connection information between the at least one first resource pool and the at least one second resource pool may be configured to the first device.

According to an embodiment of the present disclosure, a first device for performing wireless communication may be proposed. The first device may comprise: one or more memories storing instructions; one or more transceivers; and one or more processors connected to the one or more memories and the one or more transceivers, wherein the one or more processors execute the instructions to: transmit, to at least one device, at least one physical sidelink control channel (PSCCH); transmit, to the at least one device, data through at least one physical sidelink shared channel (PSSCH) related to the at least one PSCCH; determine a plurality of physical sidelink feedback channel (PSFCH) resources for receiving a plurality of sidelink hybrid automatic repeat request (HARQ) feedbacks related to the data, based on an index of a slot related to the at least one PSSCH and an index of a subchannel; and receive, from the at least one device, at least one HARQ feedback related to the data based on at least one PSFCH resource among the plurality of PSFCH resources, wherein the at least one PSCCH and the at least one PSSCH may be transmitted to the at least one device based on at least one first resource pool for a transmission, wherein the plurality of PSFCH resources may be determined within at least one second resource pool for a reception, and wherein connection information between the at least one first resource pool and the at least one second resource pool may be configured to the first device.

A UE can efficiently perform SL communication.

BRIEF DESCRIPTION OF THE DRAWINGS

FIG. 19 shows a vehicle or an autonomous vehicle, in accordance with an embodiment of the present disclosure.

Figure 1:
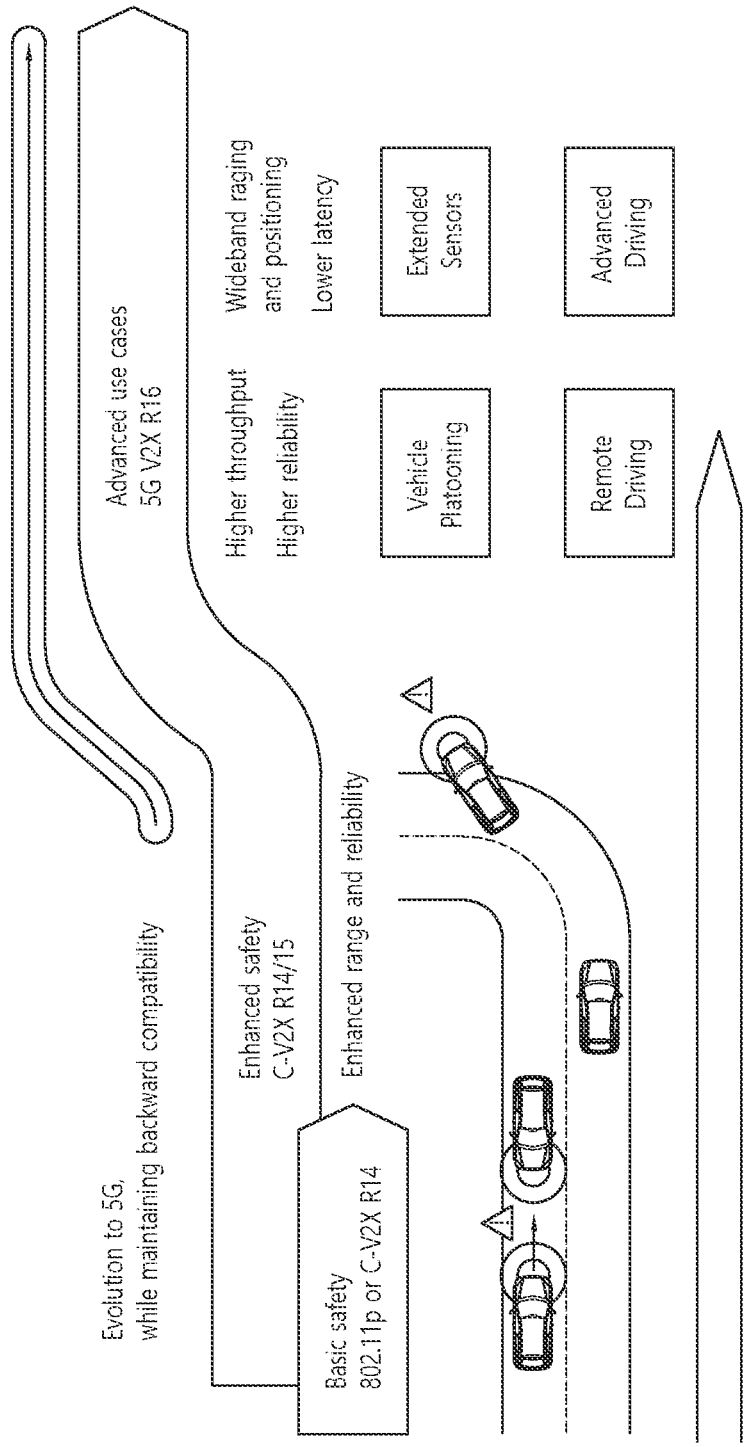
FIG. 1 is a drawing for describing V2X communication based on NR, compared to V2X communication based on RAT used before NR.

DESCRIPTION OF EXEMPLARY
EMBODIMENTS

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification. "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)" it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
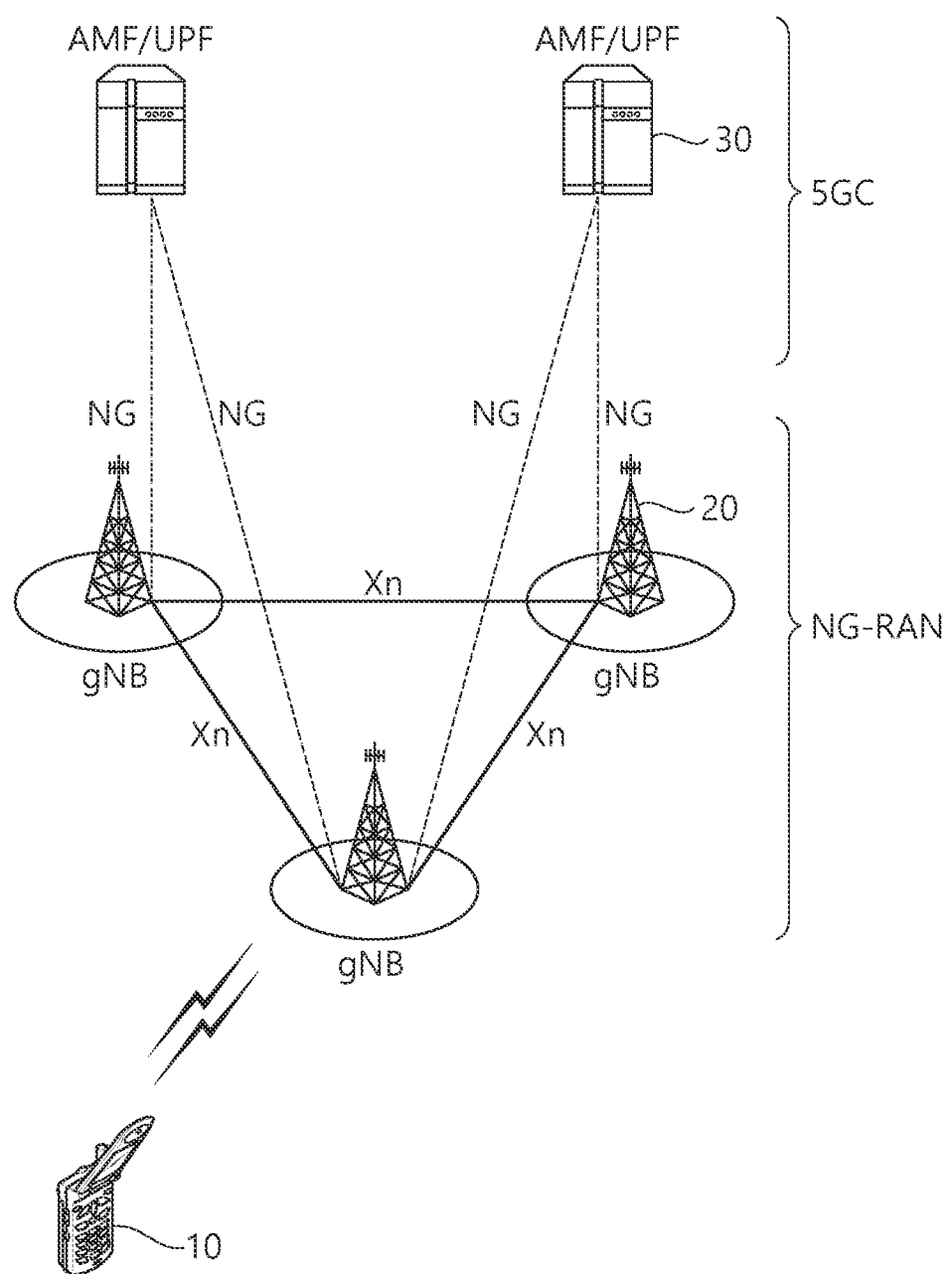
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
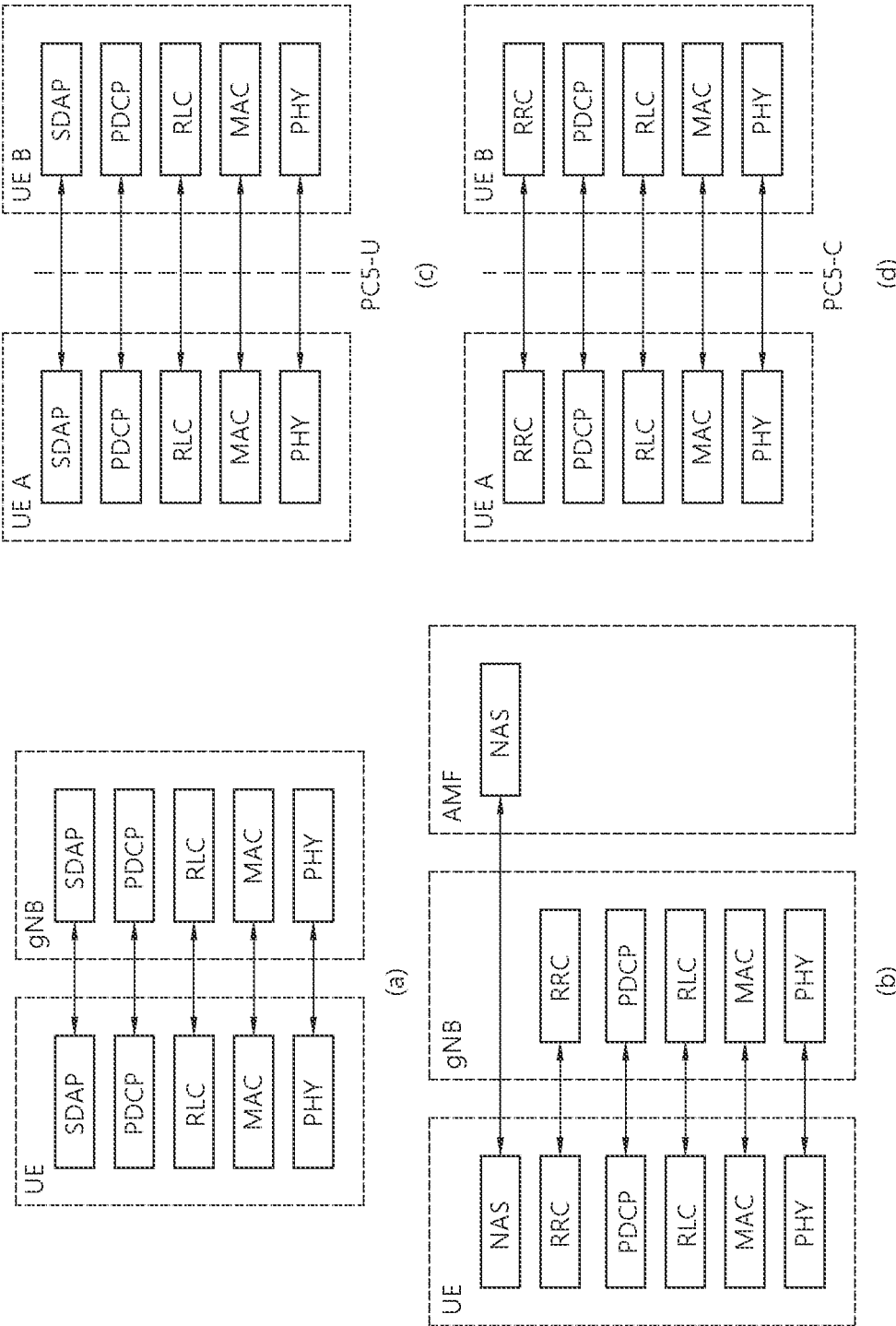
FIG. 3 shows a radio protocol architecture, in accordance with an embodiment of the present disclosure.

FIG. 3 shows a radio protocol architecture, in accordance with an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers. i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
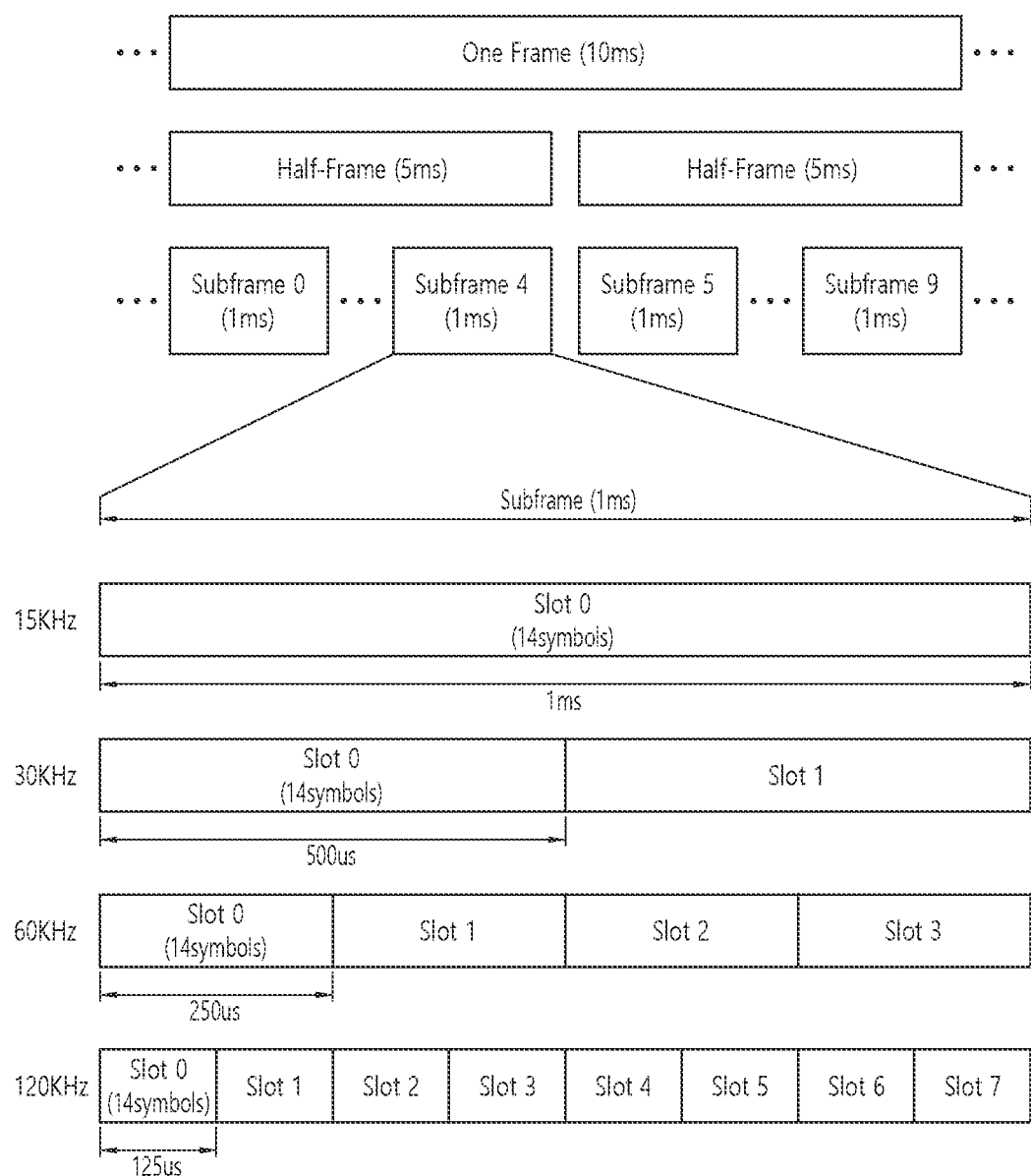
FIG. 4 shows a structure of a radio frame of an NR, in accordance with an embodiment of the present disclosure.

FIG. 4 shows a structure of a radio frame of an NR, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes. e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
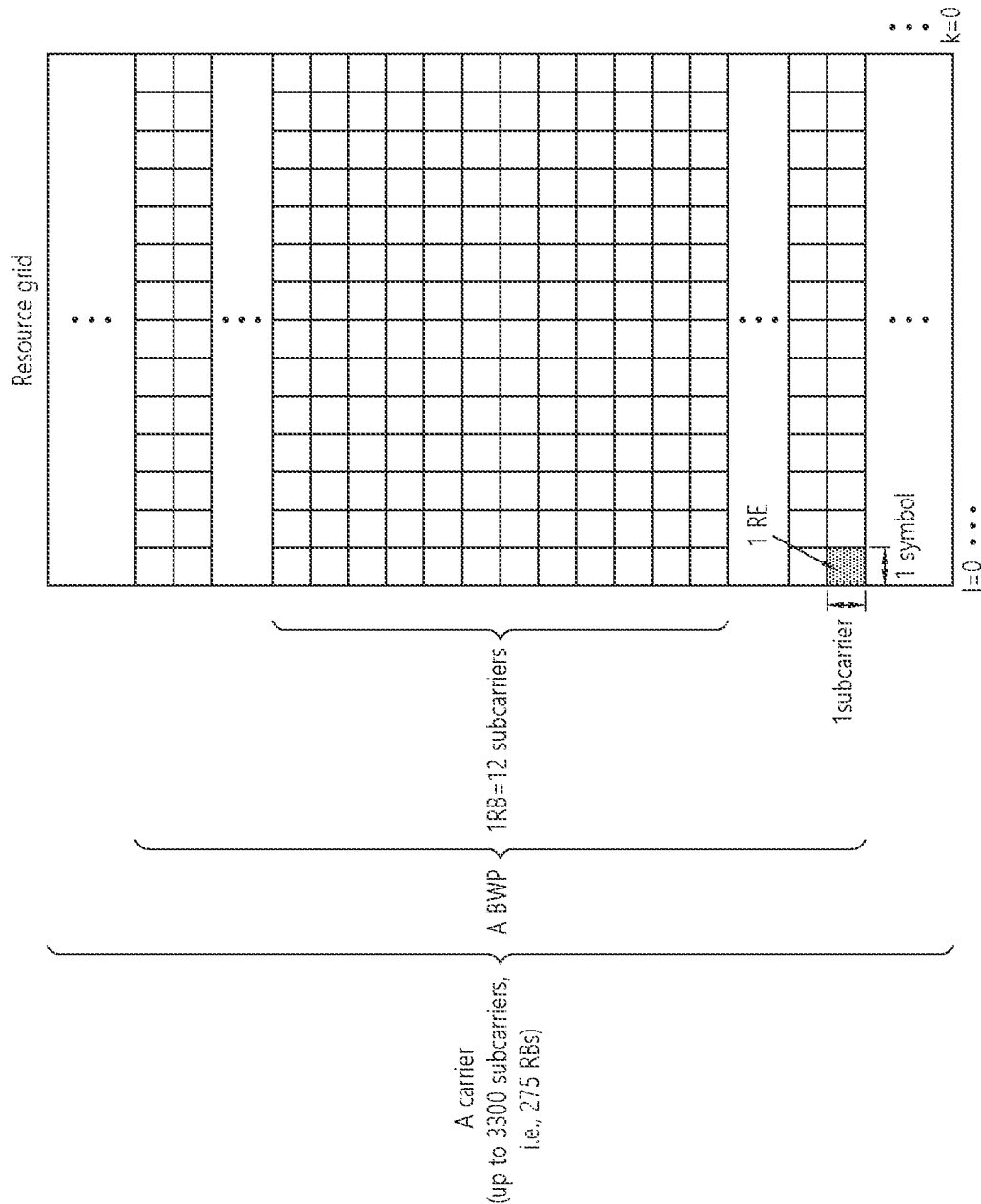
FIG. 5 shows a structure of a slot of an NR frame, in accordance with an embodiment of the present disclosure.

FIG. 5 shows a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
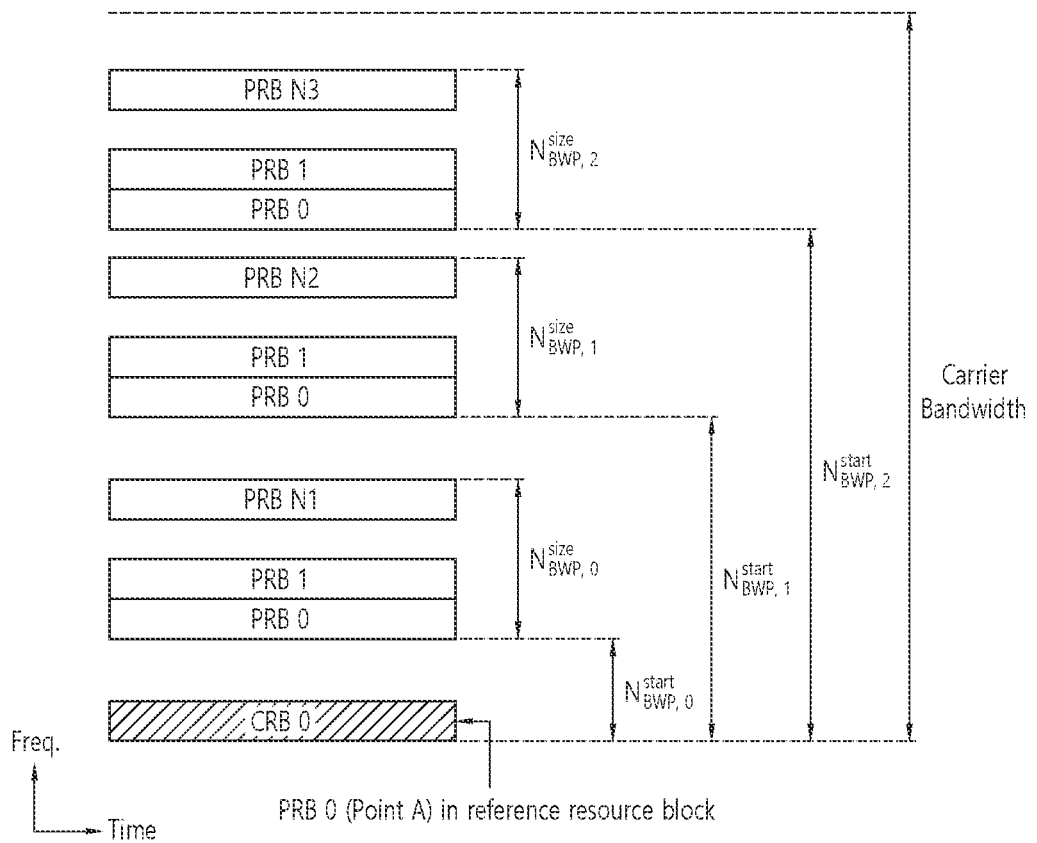
FIG. 6 shows an example of a BWP, in accordance with an embodiment of the present disclosure.

FIG. 6 shows an example of a BWP, in accordance with an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/ PSBCH block, hereinafter, sidelink-synchronization signal block (S-SSB)) supporting periodical transmission. The S-SSB may have the same numerology (i.e., SCS and CP length) as a physical sidelink control channel (PSCCH)/ physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
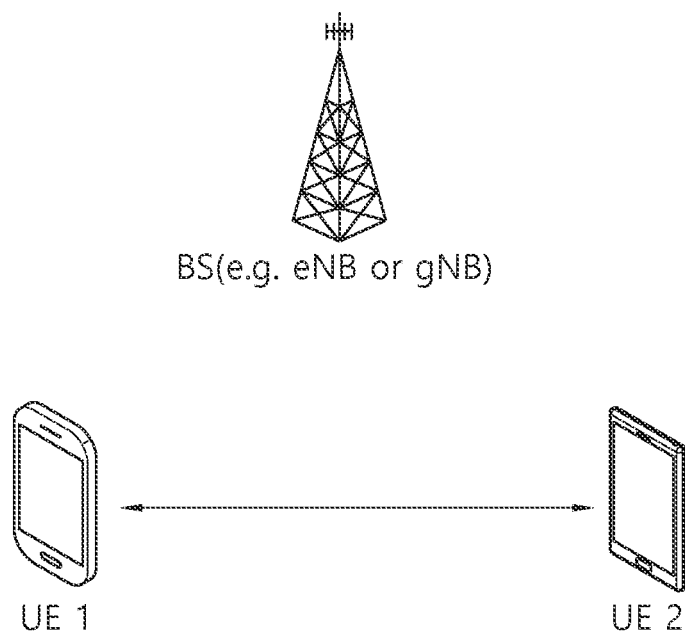
FIG. 7 shows a UE performing V2X or SL communication, in accordance with an embodiment of the present disclosure.

FIG. 7 shows a UE performing V2X or SL communication, in accordance with an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
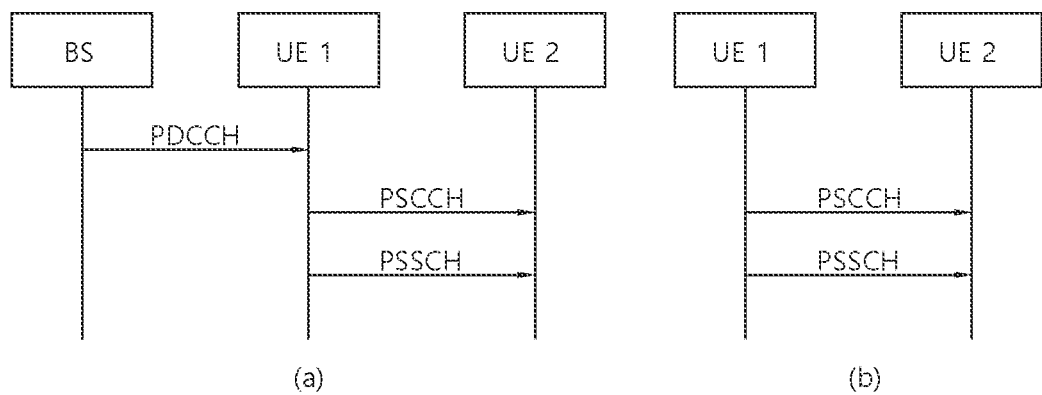
FIG. 8 shows a procedure of performing V2X or SL communication by a UE based on a transmission mode, in accordance with an embodiment of the present disclosure.

FIG. 8 shows a procedure of performing V2X or SL communication by a UE based on a transmission mode, in accordance with an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
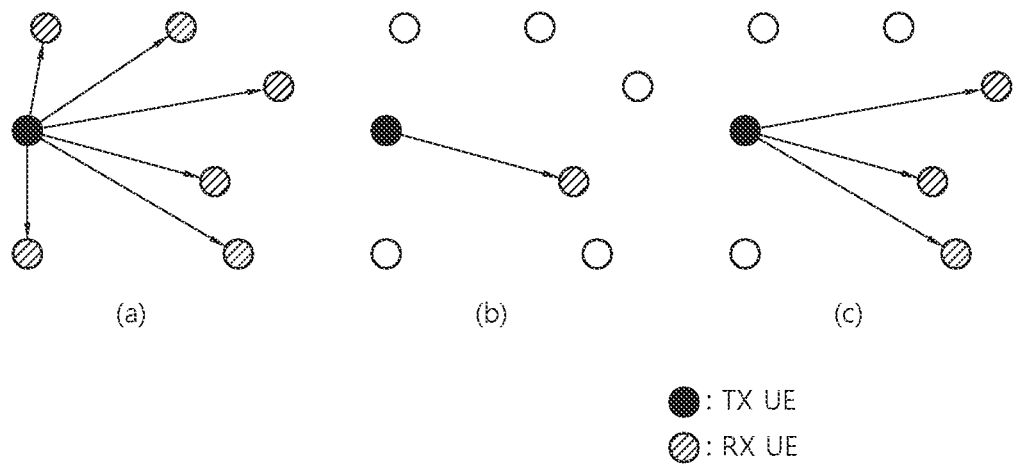
FIG. 9 shows three cast types, in accordance with an embodiment of the present disclosure.

FIG. 9 shows three cast types, in accordance with an embodiment of the present disclosure. The embodiment of FIG. 9 may be combined with various embodiments of the present disclosure. Specifically, FIG. 9(a) shows broadcast-type SL communication, FIG. 9(b) shows unicast type-SL communication, and FIG. 9(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

On the other hand, in NR V2X communication or NR sidelink communication, a transmitting UE may reserve/select one or more transmission resources for sidelink transmission (e.g., initial transmission and/or retransmission), a transmitting UE may inform the receiving UE of information on the location of the one or more transmission resources.

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 10:
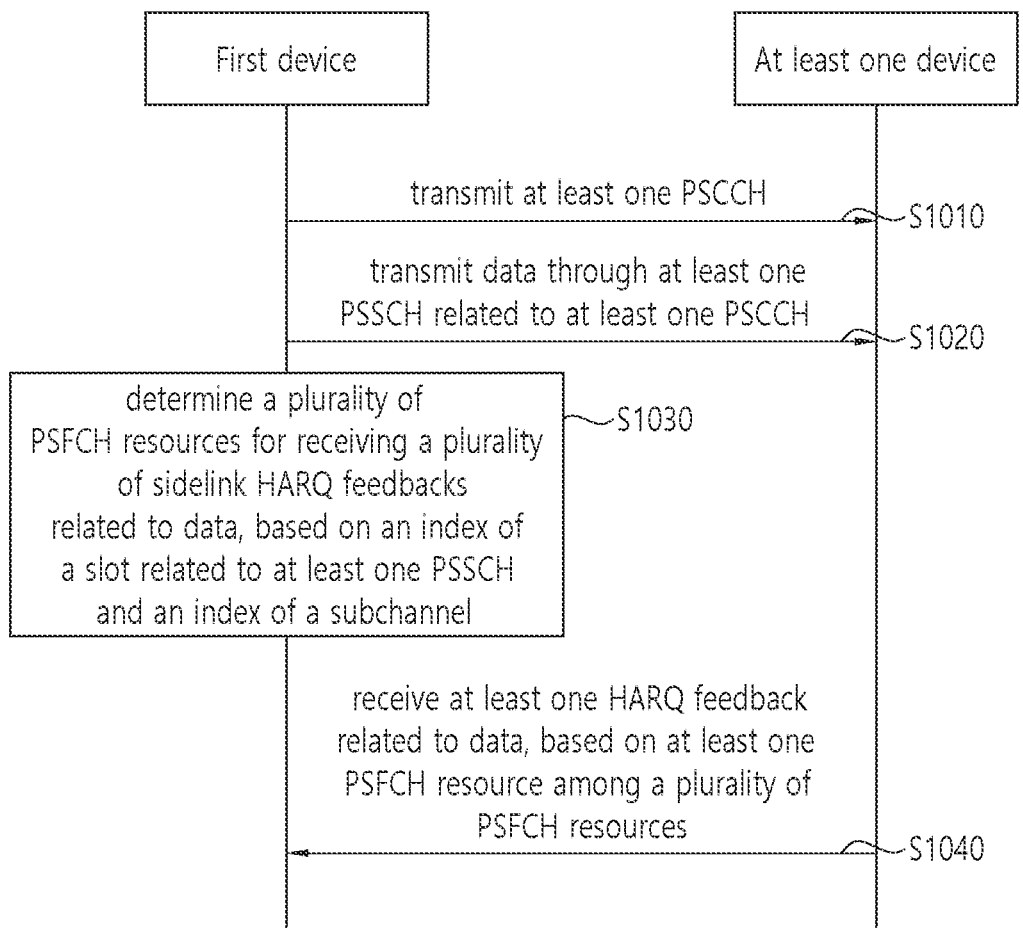
FIG. 10 shows a method in which a first device and at least one device perform sidelink communication according to an embodiment of the present disclosure.

FIG. 10 shows a method in which a first device and at least one device perform sidelink communication according to an embodiment of the present disclosure.

In step S1010, a first device according to an embodiment may transmit, to at least one device, at least one physical sidelink control channel (PSCCH). In step S1020, a first device according to an embodiment may transmit, to the at least one device, data through at least one physical sidelink shared channel (PSSCH) related to the at least one PSCCH. In step S1030, a first device according to an embodiment may determine a plurality of physical sidelink feedback channel (PSFCH) resources for receiving a plurality of sidelink hybrid automatic repeat request (HARQ) feedbacks related to the data, based on an index of a slot related to the at least one PSSCH and an index of a subchannel. In step S1040, a first device according to an embodiment may receive, from the at least one device, at least one HARQ feedback related to the data based on at least one PSFCH resource among the plurality of PSFCH resources.

In the following, embodiments and/or examples that may be directly or indirectly related to at least one of steps S1010 to S1040 are reviewed. On the other hand, the following embodiments and/or examples are only related to at least one of steps S1010 to S1040, accordingly, even if at least one of the following embodiments and/or examples and steps S1010 to S1040 do not match each other in content, the inconsistent content should not be construed as not being included in the scope of the present specification.

In the present disclosure, 'first device' may be used in the same/similar meaning as a UE, a transmission UE, a transmission UE, a TX UE, and the like, 'second device' may be used in the same/similar meaning to a UE, a receiving UE, an RX UE, etc., 'at least one device' may be used in the same/similar meaning to at least one UE, a UE, or at least one UE.

Meanwhile, in various embodiments of the present disclosure, for example, "configuring" or "defining" may include a base station or network transmitting information related to "configuration" or information related to "definition" to a UE through predefined signaling (e.g., SIB, MAC, RRC, etc.). For example, "configuring" or "defining" may include a base station or network configuring or pre-configuring information related to "configuration" or information related to "definition" for a UE.

Meanwhile, a UE may be (pre-)configured with at least one resource pool for SL transmission. Meanwhile, a UE may be (pre-)configured with at least one resource pool for SL reception. For example, network may configure or pre-configure a resource pool related to SL communication to a UE. For example, network may be a base station, a V2X server, and the like. In addition, a UE may perform SL transmission and reception using resources in the resource pool. A UE may use resources within a specific transmission resource pool when transmitting a PSCCH/PSSCH. A UE may use resources within a specific reception resource pool when receiving a PSCCH/PSSCH. A UE may use resources within a specific reception resource pool when transmitting and receiving a PSFCH.

Meanwhile, a UE may be (pre-)configured with a plurality of transmission resource pools and/or a plurality of reception resource pools. Resources in the plurality of transmission resource pools may be mutually exclusive to each other so as not to overlap resources in time and/or frequency, or may be configured in a form that allows resources to overlap in some time and/or frequency. Resources in the plurality of reception resource pools may be mutually exclusive to each other so as not to overlap resources in time and/or frequency, or may be configured in a form that allows resources to overlap in some time and/or frequency.

Meanwhile, resources within a specific transmission resource pool may belong only to resources within a specific reception resource pool. For example, resources in a first transmission resource pool and resources in a second transmission resource pool may be included in resources in a first reception resource pool, but may not be included in resources in other reception resource pools.

Meanwhile, resources within a specific transmission resource pool may be included in a union of resources within a plurality of reception resource pools. For example, resources in a first transmission resource pool may be included in the union of resources in a first reception resource pool and a second resource pool. For example, resources in a first reception resource pool may include at least some resources in a first transmission resource pool. Meanwhile, a specific resource within a specific transmission resource pool may be included in resources within a specific reception resource pool at a point in time. Alternatively, a specific resource in a specific transmission resource pool may be included in resources in a plurality of reception resource pools at a point in time.

Meanwhile, a UE may transmit HARQ-ACK feedback information for a received PSCCH/PSSCH through a PSFCH, and at this time, it is necessary to define reception resource pool information corresponding to the PSFCH resource. In particular, when a plurality of reception resource pools share some resources, ambiguity regarding positions in PSFCH time between UEs may occur, and it is necessary to avoid this. For example, according to the reception resource pool, with respect to resources in the resource pool, a UE may determine the timing configuration to transmit a PSFCH after receiving a PSCCH/PSSCH, and the position where a PSFCH resource appears according to a PSFCH resource period, and may determine the PSFCH transmit/receive location based on this. Or, for example, for the union of resources in all or part of a plurality of reception resource pools configured in a UE, a PSFCH resource may be configured according to a PSFCH resource period. More specifically, a plurality of reception resource pools may be limited to the same configurations for a PSFCH and/or the case where the boundaries between slots in the reception resource pool match or the difference is less than or equal to a certain threshold value.

On the other hand, it is necessary to have the same understanding of the method of transmitting and receiving PSCCH/PSSCH between transmitting and receiving UEs, accordingly, a transmission resource pool and a reception resource pool connected to each other may have at least the same frequency-side resource pool configuration and/or PSCCH configuration and/or PSSCH configuration and/or PSFCH configuration.

For example, the number of reception resource pools for each frequency-side resource pool configuration and/or PSCCH configuration and/or PSSCH configuration and/or PSFCH configuration may be limited to one. That is, a UE may not expect a plurality of resource pool configurations with the same frequency-side resource pool configuration and/or the same PSCCH configuration and/or the same PSSCH configuration and/or the same PSFCH configuration. The frequency-side resource pool configuration may be the subchannel size and/or the number of subchannels and/or the frequency-side location information of the first subchannel and/or the number of PRBs constituting a resource pool. In the above situation, when a UE receives a PSCCH/PSSCH, the ambiguity of the corresponding reception resource pool can be resolved, and an SL HARQ-ACK feedback may be transmitted through a PSFCH resource configured in the reception resource pool corresponding to the PSCCH/PSSCH reception.

For example, the number of reception resource pools may be plural for each frequency-side resource pool configuration, but time resources within the plurality of resource pools may be configured so as not to overlap with each other. That is, when a UE receives a PSCCH/PSSCH, it may expect that there is one reception resource pool corresponding thereto. In the above situation, when a UE receives a PSCCH/PSSCH, the ambiguity of the corresponding reception resource pool may be resolved, and an SL HARQ-ACK feedback may be transmitted through a PSFCH resource configured in a reception resource pool corresponding to the above PSCCH/PSSCH reception.

For example, connection information between a transmission resource pool and a reception resource pool may be (pre-)configured. For example, it may include information on a corresponding reception resource pool (e.g., resource pool ID) when configuring the transmission resource pool, and/or it may include information on a corresponding transmission resource pool (e.g., resource pool ID) when configuring the reception resource pool, and/or a parameter representing transmission resource pool and reception resource pool connections may be configured separately for each SL BWP or each SL carrier. A UE that has transmitted a PSCCH/PSSCH may configure timing for receiving the corresponding PSFCH based on a reception resource pool connected thereto according to a transmission resource pool used for transmission. At this time, when a plurality of reception resource pools appear, a UE may configure the PSFCH reception timing based on a selected reception resource pool, by selecting one with a resource pool ID which is the lowest or the highest, and/or one where the boundary between slots in the corresponding transmission resource pool and slots in the reception resource pool matches or the difference is lower than or equal to, or lower than a specific threshold, and/or one with a PSFCH resource in the fastest time point considering the actual PSFCH reception time after the corresponding PSCCH/PSSCH (PSSCH-to-PSFCH timing information). A UE receiving a PSCCH/PSSCH may transmit a PSFCH based on a reception resource pool including resources used for receiving the corresponding PSCCH/PSSCH. At this time, when a plurality of reception resource pools appear, a UE may configure the PSFCH transmission timing based on a corresponding selected reception resource pool, by selecting one with an ID which is the lowest or the highest, and/or one with a PSFCH resource in the fastest time point considering the actual PSFCH transmission time after the corresponding PSCCH/PSSCH (PSSCH-to-PSFCH timing information), among the reception resource pools connected to the transmission resource pool used for PSCCH/PSSCH transmission.

For example, a reception resource pool related to a transmission resource pool may be one that includes slots that match the boundaries of slots in the corresponding transmission resource pool or have a difference of less than or equal to a specific threshold value, and/or may be one including all resources in the corresponding transmission pool. Or, for example, a reception resource pool connected to each slot in a transmission resource pool may be different. A UE may configure PSFCH transmission/reception timing using a reception resource pool corresponding to the PSCCH/PSSCH transmission/reception timing. At this time, when a plurality of reception resource pools appear, a UE may configure the PSFCH transmission/reception timing based on a corresponding selected reception resource pool, by selecting one with an ID which is the lowest or the highest, and/or one with a PSFCH resource in the fastest time point considering the actual PSFCH transmission/reception time after the corresponding PSCCH/PSSCH (PSSCH-to-PSFCH timing information), among the reception resource pools connected to the transmission resource pool used for PSCCH/PSSCH transmission.

On the other hand, transmission power control for a PSCCH/PSSCH may be performed based on path loss between UEs, the path loss between UEs may be inferred by a method in which a PSCCH/PSSCH receiving UE reports an RSRP measurement result for the received PSCCH/PSSCH to a PSCCH/PSSCH transmitting UE. In this case, an RSRP measurement result may be a weighted average of L1-RSRP measured from PSCCH/PSSCH received during a specific time interval or a value converted through L3-filtering. Meanwhile, a power control parameter for a PSCCH/PSSCH may be different according to a transmission resource pool, and accordingly, average power values may be different. In the above situation, RSRP measurement for path loss measurement may be performed by a UE for each transmission resource pool. For example, a UE may measure/generate L3-RSRP for each transmission resource pool and report it to other UEs. In this case, each L3-RSRP report may include corresponding transmission resource pool information (e.g., ID). For example, a UE may measure/generate L3-RSRP for each reception resource pool and/or synchronization source for each resource pool and report it to other UEs.

On the other hand, a UE may be (pre-)configured with a plurality of reception resource pools having different at least frequency-side resource pool configuration and/or PSCCH configuration and/or PSSCH configuration and/or PSFCH configuration. At this time, PSCCH/PSSCH detection in different configurations can be performed in the same slot, which can increase complexity at a UE. For example, a UE may attempt to detect a PSCCH and/or SCI for at least one specific reception resource pool in a specific slot according to the capability of the UE. The specific reception resource pool may be randomly selected by a UE, or may be selected with the lowest or highest ID. For example, PSCCH and/or SCI may include information (e.g., ID) on a resource pool, and a UE detected the PSCCH and/or SCI may attempt PSSCH decoding based on information regarding the corresponding resource pool.

Meanwhile, a peak data rate may be configured for sidelink communication. For example, the peak data rate may be calculated by the number of PRBs derived from the total number of PRBs constituting the transmission resource pool or the number of subchannels multiplied by the subchannel size, the (pre-)configured overhead value, and the (pre-)configured SL symbol interval length, etc. A UE may expect that the peak data rate is not exceeded when transmitting a PSCCH/PSSCH. Meanwhile, a peak data rate may also be configured in terms of PSSCH reception. For example, a peak data rate for a specific reception resource pool and a peak data rate for a plurality of reception resource pools for a UE may be configured. For example, a UE may receive a plurality of PSSCHs from a plurality of reception resource pools, and the total actual data rate thereof may be expected not to exceed the peak data rate for the plurality of reception resource pools. The actual data rate may be the sum of data rates for each resource pool, or may be calculated from the total amount of resources for PSSCH received for a plurality of resource pools and the sum of TBS (which may or may not include CRC). For example, the peak data rate for each resource pool and the peak data rate for each UE for a plurality of resource pools may have different parameters (e.g., overhead values). More specifically, the peak data rate for a UE may be calculated based on at least the sum of the number of PRBs constituting the resource pool or the sum of the product of the number of subchannels and the size of a subchannel. When the actual data rate after PSCCH and/or SCI decoding at a UE is greater than the peak data rate for each UE, the UE may omit decoding of at least one specific PSSCH. For example, criteria for selecting PSSCH decoding to omit may be a case where a corresponding L1-priority is low and/or a case where the actual data rate is small and/or a case where the ID or a resource pool is big or small.

Meanwhile, in the next system, a DRX operation may be performed when trying to detect a PSCCH and/or SCI, and a DRX operation and/or parameter configuration unit may be per carrier and/or per serving cell and/or per cell group and/or per reception resource pool and/or per transmission resource pool and/or per L1-priority and/or per service type and/or per QoS parameter and/or per congestion control level and/or per whether PSFCH resource exists or not and/or per cast type and/or per carrier type (e.g., Licensed Carrier, Unlicensed Carrier, Supplementary UL Carrier, and/or ITS-only Carrier, etc.). For example, when DRX operation is different for each resource pool, it may be converting a DRX operation according to a resource pool ID indicated by the corresponding PSCCH and/or SCI or PSSCH after detecting a PSCCH and/or SCI and/or a PSSCH in the (pre-configured) basic active time period, or performing DRX operation by applying DRX parameters to resources within the resource pool indicated by SCI. For example, a DRX operation may be performed by applying a DRX parameter to a union of slots in a plurality of reception resource pools and/or transmission resource pools.

Meanwhile, a plurality of transmission resource pools for SL transmission and a plurality of reception resource pools for SL reception may be configured for a UE. In this case, the plurality of reception resource pools may correspond to different synchronization sources or may have different slot boundaries. This may be advantageous for SL communication between UEs having different synchronization sources.

Meanwhile, a UE may determine/obtain a random seed value used for generating a PSSCH DMRS sequence based on at least one of a slot index, a PSCCH CRC sequence corresponding to a PSSCH, and/or an OFDM symbol index. For example, a UE may determine/obtain a random seed value used for generating a PSSCH DMRS sequence based on Equation 1. In the present disclosure, a random seed value may be referred to as an initial value.

$$c_{init} = (2^{17}(N_{symb}^{slot} n_{s,f}^{\mu} + l + 1)(2N_{ID}+1) + 2N_{ID}) \bmod 2^{31} \quad \text{[Equation 1]}$$

Specifically, for example, a UE may generate a PSSCH DMRS sequence based on Tables 5 to 9.

TABLE 5

1 Demodulation reference signals for PSSCH
1.1 Sequence generation
The sequence $r_l(m)$ shall be generated according to $$r_l(m) = \frac{1}{\sqrt{2}}(1 - 2c(2m)) + j\frac{1}{\sqrt{2}}(1 - 2c(2m+1))$$

where the pseudo-random sequence c(m) is defined in clause 2. The pseudo-random sequence generator shall be initialized with
$c_{init} = (2^{17}(N_{symb}^{slot} n_{s,f}^{\mu} + l + 1)(2N_{ID} + 1) + 2N_{ID}) \bmod 2^{31}$
where l is the OFDM symbol number within the slot, $n_{s,f}^{\mu}$ is the slot number within a frame, and $N_{ID} = N_{ID}^X \bmod 2^{16}$ where the quantity $N_{ID}^X$ equals the decimal representation of CRC on the PSCCH associated with the PSSCH according to $N_{ID}^X = \Sigma_{i=0}^{L-1} p_i \cdot 2^{L-1-i}$ with p and L given by clause 3.

15

TABLE 6

2 Pseudo-random sequence generation
Generic pseudo-random sequences are defined by a length-31 Gold sequence. The output sequence c(n) of length $M_{PN}$, where n = 0,1,...,$M_{PN}$ − 1, is defined by
 c(n) = ($x_1$(n + $N_C$) + $x_2$(n + $N_C$))mod 2
 $x_1$(n + 31) = ($x_1$(n + 3) + $x_1$(n))mod2
 $x_2$(n + 31) = ($x_2$(n + 3) + $x_2$(n + 2) + $x_2$(n + 1) + $x_2$(n))mod2
where $N_C$ = 1600 and the first m-sequence $x_1$(n) shall be initialized with $x_1$(0) = 1, $x_1$(n) = 0, n = 1,2,...,30 .
The initialization of the second m-sequence, $x_2$(n) , is denoted by $c_{init} = \Sigma_{i=0}^{30} x_2(i) \cdot 2^i$ with the value depending on the application of the sequence.

TABLE 7

2' Polar coding

The input bit sequence to the code block segmentation is denoted by $a_0, a_1, a_2, a_3, \ldots, a_{A-1}$, where A > 0.
if $I_{seg} = 1$
 Number of code blocks: C = 2;
else
 Number of code blocks: C = 1;
end if
A'=⌈A/C⌉·C;
for i = 0 to A'−A−1
 $a'_i = 0$;
end for
for i = A'−A to A'−1
 $a'_i = a_{i-(A'-A)}$;
end for
s = 0;
for r = 0 to C − 1
 for k = 0 to A'/C − 1
  $c_{rk} = a'_s$;
  s = s + 1;
 end for
 The sequence $c_{r0}, c_{r1}, c_{r2}, c_{r3}, \ldots, c_{r(A'/C-1)}$ is used to calculate the CRC parity bits $p_{r0}, p_{r1}, p_{r2}, \ldots, p_{r(L-1)}$ according to Clause 4 with a generator polynomial of length L.
 for k = A'/C to A'/C + L − 1
  $c_{rk} = p_{r(k-A'/C)}$;
 end for
end for
The value of A is no larger than 1706.

TABLE 8

3 CRC attachment
Error detection is provided on DCI transmissions through a Cyclic Redundancy Check (CRC).
The entire payload is used to calculate the CRC parity bits. Denote the bits of the payload by $a_0, a_1, a_2, a_3, \ldots, a_{A-1}$, and the parity bits by $p_0, p_1, p_2, p_3, \ldots, p_{L-1}$, where A is the payload size and L is the number of parity bits. Let $a'_0, a'_1, a'_2, a'_3, \ldots, a'_{A+L-1}$ be a bit sequence such that $a'_i = 1$ for i = 0,1,..., L − 1 and $a'_i = a_{i-L}$ for i = L, L + 1,..., A + L − 1. The parity bits are computed with input bit sequence $a'_0, a'_1, a'_2, a'_3, \ldots, a'_{A+L-1}$ and attached according to Clause 4 by setting L to 24 bits and using the generator polynomial $g_{CRC24C}(D)$. The output bit $b_0, b_1, b_2, b_3, \ldots, b_{K-1}$ is TABLE 8-continued $b_k = a_k$      for k = 0,1,2,..., A − 1
$b_k = p_{k-A}$      for k = A, A + 1, A + 2,..., A + L − 1,
where K = A + L .
After attachment, the CRC parity bits are scrambled with the corresponding RNTI $x_{mti,0}$, $x_{mti,1}$,..., $x_{mti,15}$, where $x_{mti,0}$ corresponds to the MSB of the RNTI, to form the sequence of bits $c_0$, $c_1$, $c_2$, $c_3$,..., $c_{K-1}$. The relation between $c_k$ and $b_k$ is:
$c_k = b_k$ for k = 0, 1, 2, ..., A + 7
$c_k = (b_k + x_{mti,k-A-8})$mod 2   for k = A + 8 , A + 9 , A + 10 ,..., A + 23 .

TABLE 9

4    CRC calculation
Denote the input bits to the CRC computation by $a_0$, $a_1$, $a_2$, $a_3$,..., $a_{A-1}$, and the parity bits by
$p_0$, $p_1$, $p_2$, $p_3$,..., $p_{L-1}$, where A is the size of the input sequence and L is the number of parity bits. The parity bits are generated by one of the following cyclic generator polynomials:
-      $g_{CRC24A}(D) = [D^{24} + D^{23} + D^{18} + D^{17} + D^{14} + D^{11} + D^{10} + D^7 + D^6 + D^5 + D^4 + D^3 + D + 1]$ for a CRC length L = 24 ;
-      $g_{CRC24B}(D) = [D^{24} + D^{23} + D^6 + D^5 + D + 1]$
for a CRC length L = 24 ;
-      $g_{CRC24C}(D) = [D^{24} + D^{23} + D^{21} + D^{20} + D^{17} + D^{15} + D^{13} + D^{12} + D^8 + D^4 + D^2 + D + 1]$ for a CRC length L = 24 ;
-      $g_{CRC16}(D) = [D^{16} + D^{12} + D^5 + 1]$ for a CRC length L = 16 ;
-      $g_{CRC11}(D) = [D^{11} + D^{10} + D^9 + D^5 + 1]$ for a CRC length L = 11;
-      $g_{CRC6}(D) = [D^6 + D^5 + 1]$ for a CRC length L = 6 .
The encoding is performed in a systematic form, which means that in GF(2), the polynomial:
$a_0 D^{A+L-1} + a_1 D^{A+L-2} + ... + a_{A-1} D^L + p_0 D^{L-1} + p_1 D^{L-2} + ... + p_{L-2} D^1 + p_{L-1}$
yields a remainder equal to 0 when divided by the corresponding CRC generator polynomial.
The bits after CRC attachment are denoted by $b_0$, $b_1$, $b_2$, $b_3$,..., $b_{B-1}$, where B = A + L . The relation between $a_k$ and $b_k$ is:
$b_k = a_k$      for k = 0,1,2,..., A − 1
$b_k = p_{k-A}$     for k = A, A + 1, A + 2,..., A + L − 1 .

Meanwhile, a UE may determine/obtain a random seed value used for generating a PSCCH DMRS sequence based on at least one of a slot index, a parameter values (pre-) configured for each resource pool, and/or OFDM symbol index. For example, a UE may determine/obtain a random seed value used for generating a PSCCH DMRS sequence based on Equation 2.

$$c_{init} = (2^{17}(N_{symb}^{slot} n_{s,f}^{\mu} + l + 1)(2N_{ID} + 1) + 2N_{ID}) \bmod 2^{31}$$ [Equation 2]

Specifically, for example, a UE may generate a PSCCH DMRS sequence based on Tables 10 to 13.

TABLE 10

1.      Demodulation reference signals for PSCCH
1.1      Sequence generation
The sequence $r_l(m)$ shall be generated according to $$r_l(m) = \frac{1}{\sqrt{2}}(1 - 2c(2m)) + j\frac{1}{\sqrt{2}}(1 - 2c(2m+1))$$

where the pseudo-random sequence c(m) is defined in clause 2. The pseudo-random sequence generator shall be initialized with
     $C_{init} = (2^{17}(N_{symb}^{slot} n_{s,f}^{\mu} + l + 1)(2N_{ID} + 1) + 2N_{ID}) \bmod 2^{31}$
where
- l is the OFDM symbol number within the slot,
- $n_{s,f}^{\mu}$ is the slot number within a frame, and
- $N_{ID} \in \{0,1, ... ,65535\}$ is given by the higher-layer parameter sl-DMRS-ScrambleID.

TABLE 11

2    Pseudo-random sequence generation
Generic pseudo-random sequences are defined by a length-31 Gold sequence. The output sequence c(n) of length $M_{PN}$, where n = 0,1,..., $M_{PN}$ − 1 , is defined by
     $c(n) = (x_1(n + N_C) + x_2(n + N_C)) \bmod 2$

TABLE 11-continued $x_1(n + 31) = (x_1(n + 3) + x_1(n))\mod 2$
$x_2(n + 31) = (x_2(n + 3) + x_2(n + 2) + x_2(n + 1) + x_2(n))\mod 2$
where $N_C = 1600$ and the first m-sequence $x_1(n)$ shall be initialized with $x_1(0) = 1, x_1(n) = 0, n = 1,2,...,30$.
The initialization of the second m-sequence, $x_2(n)$, is denoted by $c_{init} = \Sigma_{i=0}^{30} x_2(i) \cdot 2^i$ with the value depending on the application of the sequence.

TABLE 12

2' Polar coding

The input bit sequence to the code block segmentation is denoted by $a_0, a_1, a_2, a_3, \ldots, a_{A-1}$, where $A > 0$.
if $I_{seg} = 1$
   Number of code blocks: $C = 2$;
else
   Number of code blocks: $C = 1$;
end if
$A' = \lceil A/C \rceil \cdot C$;
for i = 0 to A'−A−1
   $a'_i = 0$;
end for
for i = A'−A to A'−1
   $a'_i = a_{i-(A'-A)}$;
end for
s = 0;
for r = 0 to C − 1
   for k = 0 to A'/C − 1
      $c_{rk} = a'_s$;
      s = s + 1;
   end for
   The sequence $c_{r0}, c_{r1}, c_{r2}, c_{r3}, \ldots, c_{r(A'/C-1)}$ is used to calculate the CRC parity bits $p_{r0}, p_{r1}, p_{r2}, \ldots, p_{r(L-1)}$
      according to Clause 3 with a generator polynomial of length L.
   for k = A'/C to A'/C + L − 1
      $c_{rk} = p_{r(k-A'/C)}$;
   end for
end for
The value of A is no larger than 1706.

TABLE 13

3   CRC calculation

Denote the input bits to the CRC computation by $a_0, a_1, a_2, a_3, \ldots, a_{A-1}$, and the parity bits by
$p_0, p_1, p_2, p_3, \ldots, p_{L-1}$, where A is the size of the input sequence and L is the number of parity bits. The parity bits are generated by one of the following cyclic generator polynomials:

- $g_{CRC24A}(D) = [D^{24} + D^{23} + D^{18} + D^{17} + D^{14} + D^{11} + D^{10} + D^7 + D^6 + D^5 + D^4 + D^3 + D + 1]$ for a CRC length L = 24 ;
- $g_{CRC24B}(D) = [D^{24} + D^{23} + D^6 + D^5 + D + 1]$ for a CRC length L = 24 ;
- $g_{CRC24C}(D) = [D^{24} + D^{23} + D^{21} + D^{20} + D^{17} + D^{15} + D^{13} + D^{12} + D^8 + D^4 + D^2 + D + 1]$ for a CRC length L = 24 ;
- $g_{CRC16}(D) = [D^{16} + D^{12} + D^5 + 1]$ for a CRC length L = 16 ;
- $g_{CRC11}(D) = [D^{11} + D^{10} + D^9 + D^5 + 1]$ for a CRC length L = 11;
- $g_{CRC6}(D) = [D^6 + D^5 + 1]$ for a CRC length L = 6 .

The encoding is performed in a systematic form, which means that in GF(2), the polynomial:
$a_0 D^{A+L-1} + a_1 D^{A+L-2} + \ldots + a_{A-1} D^L + p_0 D^{L-1} + p_1 D^{L-1} + p_1 D^{L-2} + \ldots + p_{L-2} D^1 + p_{L-1}$
yields a remainder equal to 0 when divided by the corresponding CRC generator polynomial.
The bits after CRC attachment are denoted by $b_0, b_1, b_2, b_3, \ldots, b_{B-1}$, where $B = A + L$. The relation between $a_k$ and $b_k$ is:
   $b_k = a_k$      for k = 0,1,2,..., A − 1
   $b_k = p_{k-A}$    for k = A, A + 1, A + 2,..., A + L − 1 .

Meanwhile, a UE may determine/obtain a random seed value used or generating an SL CSI-RS sequence based on at least one of a slot index, a PSCCH CRC sequence triggering the corresponding SL CSI-RS, and/or an OFDM symbol index. For example, a UE may determine/obtain a random seed value used for generating an SL CSI-RS sequence based on Equation 3.

$$c_{init}=(2^{10}(N_{symb}^{slot}n_{s,f}^{\mu}+l+1)(2n_{ID}+1)+2n_{ID}) \mod 2^{31} \quad \text{[Equation 3]}$$

Specifically, for example, a UE may generate an SL CSI-RS sequence based on Tables 14 to 18.

TABLE 14

| | |
|---|---|
| 1 | CSI reference signals |
| 1.1 | Sequence generation |

The sequence r(m) shall be generated according to $$r(m) = \frac{1}{\sqrt{2}}(1 - 2c(2m)) + j\frac{1}{\sqrt{2}}(1 - 2c(2m+1))$$

where the pseudo-random sequence c(i) is defined in clause 2. The pseudo-random sequence generator shall be initialised with $$c_{init} = (2^{10}(N_{symb}^{slot}n_{s,f}^{\mu} + l + 1)(2n_{ID} + 1) + n_{ID}) \mod 2^{31}$$

at the start of each OFDM symbol where $n_{s,f}^{\mu}$ is the slot number within a radio frame, l is the OFDM symbol number within a slot, and $N_{ID} = N_{ID}^{X} \mod 2^{10}$ where the quantity $N_{ID}^{X}$ equals the decimal representation of CRC for the sidelink control information mapped to the PSCCH associated with the CSI-RS according to $N_{ID}^{X} = \Sigma_{i=0}^{L-1} p_i \cdot 2^{L-1-i}$ with p and L given by clause 3.

TABLE 15

2 Pseudo-random sequence generation
Generic pseudo-random sequences are defined by a length-31 Gold sequence. The output sequence c(n) of length $M_{PN}$, where n = 0,1,..., $M_{PN}$ − 1, is defined by
$\quad c(n) = (x_1(n + N_C) + x_2(n + N_C)) \mod 2$
$\quad x_1(n + 31) = (x_1(n + 3) + x_1(n)) \mod 2$
$\quad x_2(n + 31) = (x_2(n + 3) + x_2(n + 2) + x_2(n + 1) + x_2(n)) \mod 2$
where $N_C = 1600$ and the first m-sequence $x_1(n)$ shall be initialized with $x_1(0) = 1$, $x_1(n) = 0$, n = 1,2,...,30.
The initialization of the second m-sequence, $x_2(n)$, is denoted by $c_{init} = \Sigma_{i=0}^{30}x_2(i) \cdot 2^i$ with the value depending on the application of the sequence.

TABLE 16

| 2' Polar coding |
|---|

The input bit sequence to the code block segmentation is denoted by $a_0, a_1, a_2, a_3, \ldots, a_{A-1}$, where A > 0.
if $I_{seg} = 1$
$\quad$Number of code blocks: C = 2;
else
$\quad$Number of code blocks: C = 1
end if
A'=⌈A/C⌉·C;
for i = 0 to A'−A−1
$\quad$a'$_i$ = 0;
end for
for i = A'−A to A'−1
$\quad$a'$_i$ = a$_{i-(A'-A)}$;
end for
s = 0;
for r = 0 to C − 1
$\quad$for k = 0 to A'/C − 1
$\quad\quad$c$_{rk}$ = a'$_s$;
$\quad\quad$s = s + 1;
$\quad$end for
The sequence $c_{r0}, c_{r1}, c_{r2}, c_{r3}, \ldots, c_{r(A'/C-1)}$ is used to calculate the CRC parity bits $p_{r0}, p_{r1}, p_{r2}, \ldots, p_{r(L-1)}$
$\quad$according to Clause 4 with a generator polynomial of length L.
$\quad$for k = A'/C to A'/C + L − 1
$\quad\quad$c$_{rk}$ = p$_{r(k-A'/C)}$;
$\quad$end for
end for
The value of A is no larger than 1706.

TABLE 17

3  CRC attachment
Error detection is provided on DCI transmissions through a Cyclic Redundancy Check (CRC).
The entire payload is used to calculate the CRC parity bits. Denote the bits of the payload by
$a_0$, $a_1$, $a_2$, $a_3$ ,..., $a_{A-1}$, and the parity bits by $p_0$, $p_1$, $p_2$, $p_3$ ,..., $p_{L-1}$, where A is the payload size and L
is the number of parity bits. Let $a'_0$, $a'_1$, $a'_2$, $a'_3$ ,..., $a'_{A+L-1}$ be a bit sequence such that $a'_i = 1$ for
$i = 0,1,..., L - 1$ and $a'_i = a_{i-L}$ for $i = L, L + 1,..., A + L - 1$. The parity bits are computed with input bit
sequence $a'_0$, $a'_1$, $a'_2$, $a'_3$ ,..., $a'_{A+L-1}$ and attached according to Clause 4 by setting L to 24 bits and using
and attached according to Clause 4 by setting Z to 24 bits and using
the generator polynomial $g_{CRC4C}(D)$. The output bit $b_0$, $b_1$, $b_2$, $b_3$ ,..., $b_{K-1}$ is
   $b_k = a_k$                for $k = 0,1,2,..., A - 1$
   $b_k = p_{k-A}$            for $k = A, A + 1, A + 2,..., A + L - 1$,
where $K = A + L$.
After attachment, the CRC parity bits are scrambled with the corresponding RNI $x_{mti,0}$, $x_{mti,1}$ ,..., $x_{mti,15}$,
where $x_{mti,0}$ corresponds to the MSB of the RNTI, to form the sequence of bits $c_0$, $c_1$, $c_2$, $c_3$ ,..., $c_{K-1}$. The
relation between $c_k$ and $b_k$ is:
   $c_k = b_k$ for $k = 0, 1, 2, ..., A + 7$
   $c_k = (b_k + x_{mti,k-A-8}) \bmod 2$     for $k = A + 8, A + 9, A + 10 ,..., A + 23$.

TABLE 18

4  CRC calculation
Denote the input bits to the CRC computation by $a_0$, $a_1$, $a_2$, $a_3$ ,..., $a_{A-1}$, and the parity bits by
$p_0$, $p_1$, $p_2$, $p_3$ ,..., $p_{L-1}$, where A is the size of the input sequence and L is the number of parity bits. The
parity bits are generated by one of the following cyclic generator polynomials:
- $g_{CRC24A}(D) = [D^{24} + D^{23} + D^{18} + D^{17} + D^{14} + D^{11} + D^{10} + D^7 + D^6 + D^5 + D^4 + D^3 + D + 1]$ for a CRC length $L = 24$;
- $g_{CRC24B}(D) = [D^{24} + D^{23} + D^6 + D^5 + D + 1]$ for a CRC length $L = 24$;
- $g_{CRC24C}(D) = [D^{24} + D^{23} + D^{21} + D^{20} + D^{17} + D^{15} + D^{13} + D^{12} + D^8 + D^4 + D^2 + D + 1]$ for a CRC length $L = 24$;
- $g_{CRC16}(D) = [D^{16} + D^{12} + D^5 + 1]$ for a CRC length $L = 16$;
- $g_{CRC11}(D) = [D^{11} + D^{10} + D^9 + D^5 + 1]$ for a CRC length $L = 11$;
- $g_{CRC6}(D) = [D^6 + D^5 + 1]$ for a CRC length $L = 6$.
The encoding is performed in a systematic form, which means that in GF(2), the polynomial:
$a_0 D^{A+L-1} + a_1 D^{A+L-2} + ... + a_{A-1} D^L + p_0 D^{L-1} + p_1 D^{L-2} + ... + p_{L-2} D^1 + p_{L-1}$
yields a reminder equal to 0 when divided by the corresponding CRC generator polynomial.
The bits after CRC attachment are denoted by $b_0$, $b_1$, $b_2$, $b_3$ ,..., $b_{B-1}$, where $B = A + L$. The relation
between $a_k$ and $b_k$ is:
   $b_k = a_k$       for $k = 0,1,2,..., A - 1$
   $b_k = p_{k-A}$   for $k = A, A + 1, A + 2,..., A + L - 1$.

40

Meanwhile, a UE may determine/obtain a random seed value used for generating a PSFCH cyclic shift hopping sequence based on at least one of a slot index, an identifier (ID), and/or an OFDM symbol index. Here, for example, the ID may be an ID (e.g., sl-PSFCH-HopID) configured by an upper layer. For example, a base station/network may transmit information related to the ID to a UE. For example, a base station network may transmit information related to the ID to a UE through an RRC message. For example, a UE may determine/obtain a random seed value used for generating a PSFCH cyclic shift hopping sequence based on Equation 4.

$$n_{CS}(n_{s,f}^\mu, l) = \sum_{m=0}^{7} 2^m c(8 N_{symb}^{slot} n_{s,f}^\mu + 8l + m) \qquad \text{[Equation 4]}$$

Specifically, for example, a UE may generate a PSFCH cyclic shift hopping sequence based on Tables 19 and 20.

TABLE 19

1  Cyclic shift bopping
The cyclic shift α varies as a function of the symbol and slot number according to $$\alpha_l = \frac{2\pi}{N_{sc}^{RB}} \left( (m_0 + m_{cs} + m_{int} + n_{cs}(n_{s,f}^\mu, l + l')) \bmod N_{sc}^{RB} \right)$$

where
- $n_{s,f}^\mu$ is the slot number in the radio frame
- l is the OFDM symbol number in the PSFCH transmission where $l = 0$ corresponds to the first OFDM symbol of the PSFCH transmission,
- l' is the index of the OFDM symbol in the slot that corresponds to the first OFDM symbol of the PSFCH transmission in the slot TABLE 19-continued

- $m_0$ is given by the number of cyclic shift pair in a resource pool and the associated PSSCH resource
- $m_{cs}$ is given by SL HARQ-ACK information
- $m_{int} = 0$ The function $n_{cs}(n_c,l)$ is given by $$n_{cs}(n_{s,f}^\mu, l) = \Sigma_{m=0}^{7} 2^m c(8N_{symb}^{slot} n_{s,f}^\mu + 8l + m)$$

where the pseudo-random sequence c(i) is defined by clause 2. The pseudo-random sequence generator shall be initialized with $C_{init} = n_{ID}$, where $n_{ID}$ is given by the higher-layer parameter sl-PSFCH-HopID if configured; otherwise, $n_{ID} = 0$.

TABLE 20

2  Pseudo-random sequence generation
Generic pseudo-random sequences are defined by a length-31 Gold sequence. The output sequence c(n) of length $M_{PN}$, where $n = 0,1,...,M_{PN} - 1$, is defined by
   $c(n) = (x_1(n + N_C) + x_2(n + N_C)) \bmod 2$
   $x_1(n + 31) = (x_1(n + 3) + x_1(n)) \bmod 2$
   $x_2(n + 31) = (x_2(n + 3) + x_2(n + 2) + x_2(n + 1) + x_2(n)) \bmod 2$
where $N_C = 1600$ and the first m-sequence $x_1(n)$ shall be initialized with $x_1(0) = 1, x_1(n) = 0, n = 1,2,...,30$.
The initialization of the second m-sequence, $x_2(n)$, is denoted by $c_{init} = \Sigma_{i=0}^{30} x_2(i) \cdot 2^i$ with the value depending on the application of the sequence.

Figure 11:
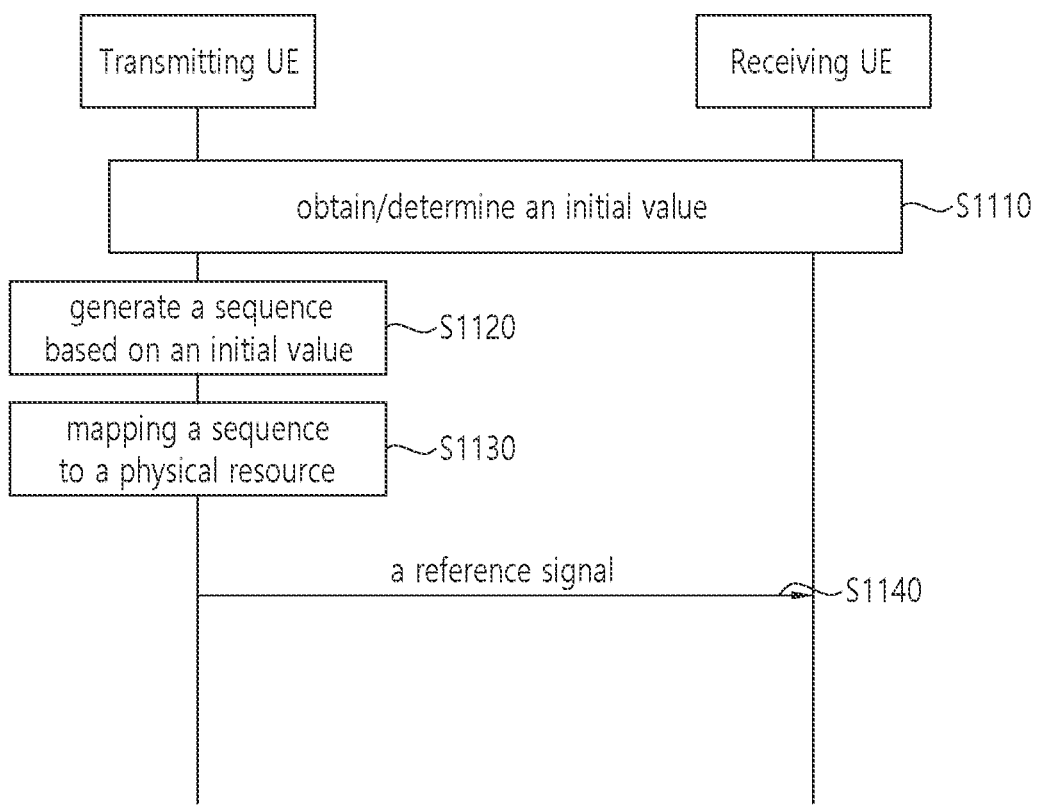
FIG. 11 is a flowchart showing a method for transmitting and receiving a reference signal by a UE according to another embodiment of the present disclosure.

FIG. 11 is a flowchart showing a method for transmitting and receiving a reference signal by a UE according to another embodiment of the present disclosure.

The embodiment of FIG. 11 may be combined with various embodiments of the present disclosure.

Referring to FIG. 11, in step S1110, a transmitting UE may obtain/determine an initial value (ie, a random seed value) used for sequence generation. In the above embodiment, a UE may obtain/determine a random seed value used to generate a PSCCH DMRS sequence and/or a PSSCH DMRS sequence and/or an SL CSI-RS sequence, based on a slot index. Here, for example, the slot index may be a logical slot index for a slot set belonging to a resource pool within 10240 ms. For example, the slot index may be a logical slot index for a slot set belonging to a resource pool within a System Frame Number (SFN) cycle. For example, the slot index may be a logical slot index for a slot set belonging to a resource pool within a Direct Frame Number (DFN) cycle. For example, the slot index may be a logical slot index for a slot set(s) targeted for a resource pool within 10240 ms. For example, the slot index may be a logical slot index for a slot set(s) targeted for a resource pool within an SFN cycle. For example, the slot index may be a logical slot index for a slot set(s) that is a target of a resource pool within a DFN cycle. For example, the slot set(s) that are the target of the resource pool may be a slot set before applying a bitmap for slots after excluding slots for which SLs are not allowed based on the number of S-SSB slots and/or SL start symbols and SL symbols in the resource pool configuration and/or reserved slots determined according to the bitmap length.

For example, a slot where SL is not allowed based on an SL start symbol and the number of SL symbols (e.g., N) may be a slot in which at least one symbol among N SL symbols from an SL start symbol in the slot is not a cell-specific UL symbol. For example, when at least one symbol among N SL symbols from an SL start symbol in a slot is not a cell-specific UL symbol, a UE may determine/regard the slot as a slot in which SL is not allowed. Here, for example, N may be a positive integer. For example, a slot targeted for a resource pool may be a cell-specific UL slot and/or a slot including a cell-specific UL symbol. In this case, a symbol interval equal to the number of SL symbols from an SL start symbol in a slot including a UL symbol may be a UL resource (e.g., UL symbol). For example, a base station/network may transmit information related to the cell-specific UL symbol and/or information related to the cell-specific UL slot to a UE. For example, a base station/network may transmit information related to the cell-specific UL symbol and/or information related to the cell-specific UL slot to a UE through cell-specific RRC message/signaling. For example, the cell-specific UL symbol and/or the cell-specific UL slot may be configured or pre-configured for a UE. For example, information related to the cell-specific UL symbol and/or information related to the cell-specific UL slot may be transmitted to a UE through a PSBCH.

For example, the slot index may be a physical slot index for all slots in an SFN cycle. For example, the position of slot index 0 may be a slot after an offset based on the start time of SFN0. Here, for example, a UE may receive information related to the offset from a base station/network. For example, a UE may receive an RRC message including information related to the offset from a base station/network. For example, information related to the offset may be defined, configured, or pre-configured for a UE.

For example, the slot index may be a physical slot index for all slots in a DFN cycle. For example, the position of slot index 0 may be a slot after an offset based on the start time of DFN0. Here, for example, a UE may receive information related to the offset from a base station/network. For example, a UE may receive an RRC message including information related to the offset from a base station/network. For example, information related to the offset may be defined, configured, or pre-configured for a UE.

For example, the slot index may be a physical slot index for all slots within 10240 ms. For example, the location of the slot index 0 may be a slot after an offset is applied based on the start time of the first slot within 10240 ms. Here, for example, a UE may receive information related to the offset from a base station/network. For example, a UE may receive an RRC message including information related to the offset from a base station/network. For example, information related to the offset may be defined, configured, or pre-configured for a UE.

For example, the unit of the offset may be msec. In this case, according to SCS related to SL BWP configured for a UE, the msec-unit offset may be converted into a slot number unit. For example, a UE may change the offset in msec units to the number of slots based on SCS related to the configured SL BWP. Alternatively, for example, the unit of the offset may be the number of slots.

For example, w % ben UEs operating in different serving cells perform SL communication with each other, the offset value may be configured for a UE such that logical slot index values in the same physical slot are equal to each other. For example, when UEs having different positions of SFN0 perform SL communication with each other, the offset value may be configured for the UEs such that logical slot index values in the same physical slot are the same. For example, when UEs having different positions of DFN0 perform SL communication with each other, the offset value may be configured for the UEs such that logical slot index values in the same physical slot are the same. In the above case, for example, when logical slot index values are not the same for the same physical slot, SL communication between corresponding UEs may not be expected. For example, when logical slot index values are not the same for the same physical slot, corresponding UEs may not perform SL communication with each other.

According to the above-described embodiment, it may be useful for interference randomization of the sequences between overlapping resource pools. According to the above-described embodiment, SL communication can be efficiently performed between different UEs belonging to different serving cells.

Meanwhile, the understanding of the sequences needs to be the same between a transmitting UE and a receiving UE. For example, a receiving UE may not be aware of transmission resource pool information of a transmitting UE. In this case, for example, a transmitting UE may obtain/determine a random seed value used to generate a PSCCH DMRS sequence based on a logical slot index for a reception resource pool related to a resource pool used for transmission (or reception) (or related to a synchronization reference source). For example, a transmitting UE may obtain/determine a random seed value used to generate a PSSCH DMRS sequence based on a logical slot index for a reception resource pool related to a resource pool used for transmission (or reception) (or related to a synchronization reference source). For example, a transmitting UE may obtain/determine a random seed value used to generate an SL CSI-RS sequence based on a logical slot index for a reception resource pool related to a resource pool used for transmission (or reception) (or related to a synchronization reference source). For example, a receiving UE may obtain/determine a random seed value used to generate a PSCCH DMRS sequence based on a logical slot index for a reception resource pool (related to a synchronization reference source) used for reception (or transmission). For example, a receiving UE may obtain/determine a random seed value used to generate a PSSCH DMRS sequence based on a logical slot index for a reception resource pool (related to a synchronization reference source) used for reception (or transmission). For example, a receiving UE may obtain/determine a random seed value used to generate an SL CSI-RS sequence based on a logical slot index for a reception resource pool (related to a synchronization reference source) used for reception (or transmission).

For example, a transmitting UE may obtain/determine a random seed value used to generate a PSCCH DMRS sequence, based on a logical slot index for a resource pool indicated by transmitted SCI, and a receiving UE may obtain/determine a random seed value used to generate a PSCCH DMRS sequence, based on a logical slot index for a resource pool indicated by received SCI. For example, a transmitting UE may obtain/determine a random seed value used to generate a PSSCH DMRS sequence, based on a logical slot index for a resource pool indicated by transmitted SCI, and a receiving UE may obtain/determine a random seed value used to generate a PSSCH DMRS sequence, based on a logical slot index for a resource pool indicated by received SCI. For example, a transmitting UE may obtain/determine a random seed value used to generate an SL CSI-RS sequence, based on a logical slot index for a resource pool indicated by transmitted SCI, and a receiving UE may obtain/determine a random seed value used to generate an SL CSI-RS sequence, based on a logical slot index for a resource pool indicated by received SCI.

For example, a transmitting UE may obtain/determine a random seed value used to generate a PSCCH DMRS sequence, based on a logical slot index for a resource pool indicated by transmitted information, a receiving UE may obtain/determine a random seed value used to generated a PSCCH DMRS sequence, based on a logical slot index for a resource pool indicated by received information. For example, a transmitting UE may obtain/determine a random seed value used to generate a PSSCH DMRS sequence, based on a logical slot index for a resource pool indicated by transmitted information, a receiving UE may obtain/determine a random seed value used to generated a PSSCH DMRS sequence, based on a logical slot index for a resource pool indicated by received information. For example, a transmitting UE may obtain/determine a random seed value used to generate an SL CSI-RS sequence, based on a logical slot index for a resource pool indicated by transmitted information, a receiving UE may obtain/determine a random seed value used to generated an SL CSI-RS sequence, based on a logical slot index for a resource pool indicated by received information. For example, the information may be a wake-up signal and/or assistance information.

In step S1120, a transmitting UE may generate a sequence based on an initial value. For example, a transmitting UE may obtain an initial value based on at least one of Tables 5 to 18 and generate a sequence based on the initial value.

In step S1130, a transmitting UE may map the generated sequence to a physical resource. In step S1140, a transmitting UE may transmit a reference signal. For example, a receiving UE may receive/decode a reference signal based on an initial value.

In the embodiments of the present disclosure, parameters referred to when generating a PSCCH DMRS sequence, a PSSCH DMRS sequence, and an SL CSI-RS sequence have been described, but the technical idea of the present disclosure can be extended and applied to the generation of other additional types of sequences/scrambling/hopping.

In an embodiment of the present disclosure, a specific parameter being (pre-)configured may include a case of configuring PC5-RRC between UEs.

In an embodiment of the present disclosure, indicating through a PSCCH may be interpreted as indicating through a first SCI, and also indicating through SCI may be interpreted as indicating through a first SCI and/or a second SCI. Indicating through a PSSCH may be interpreted as indicating through second SCI and/or indicating through PC5-RRC and/or (pre)configuration and/or MAC message.

According to various embodiments of the present disclosure, when network configures an SL resource pool for a UE, an in-coverage UE and an out-of-coverage UE can efficiently perform SL communication.

Figure 12:
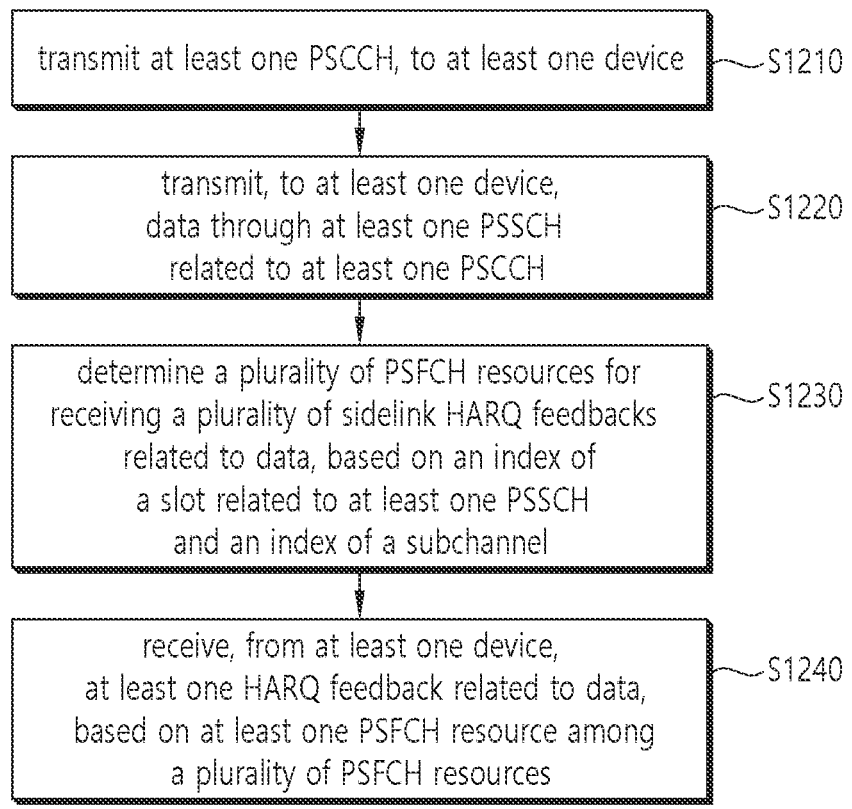
FIG. 12 is a flowchart showing a method in which a first device performs sidelink communication according to an embodiment of the present disclosure.

FIG. 12 is a flowchart showing a method in which a first device performs sidelink communication according to an embodiment of the present disclosure.

Operations disclosed in the flowchart of FIG. 12 may be performed in combination with various embodiments of the present disclosure. In one example, the operations disclosed in the flowchart of FIG. 12 may be performed based on at least one of the devices shown in FIGS. 14 to 19. In one example, the first device of FIG. 12 may correspond to the first wireless device 100 of FIG. 15 described later, and at least one device may correspond to the second wireless device 200 of FIG. 15. In another example, the first device of FIG. 12 may correspond to the second wireless device 200 of FIG. 15 described later, and at least one device may correspond to the first wireless device 100.

In step S1210, a first device according to an embodiment may transmit, to at least one device, at least one physical sidelink control channel (PSCCH).

In step S1220, a first device according to an embodiment may transmit, to the at least one device, data through at least one physical sidelink shared channel (PSSCH) related to the at least one PSCCH.

In step S1230, a first device according to an embodiment may determine a plurality of physical sidelink feedback channel (PSFCH) resources for receiving a plurality of sidelink hybrid automatic repeat request (HARQ) feedbacks related to the data, based on an index of a slot related to the at least one PSSCH and an index of a subchannel.

In step S1240, a first device according to an embodiment may receive, from the at least one device, at least one HARQ feedback related to the data based on at least one PSFCH resource among the plurality of PSFCH resources.

In an embodiment, the at least one PSCCH and the at least one PSSCH may be transmitted to the at least one device based on at least one first resource pool for a transmission.

In an embodiment, the plurality of PSFCH resources may be determined within at least one second resource pool for a reception.

In an embodiment, connection information between the at least one first resource pool and the at least one second resource pool may be configured to the first device.

In an embodiment, it may be determined that a plurality of resource pools with the same frequency resource configuration, a plurality of resource pools with the same PSCCH configuration, a plurality of resource pools with the same PSSCH configuration or a plurality of resource pool with the same PSFCH configuration does not exist, by the first device.

In an embodiment, a first device according to an embodiment may generate a sequence related to a sidelink reference signal, based on a logical slot index. Also, a first device according to an embodiment may map the sequence to a sidelink resource.

In an embodiment, the sidelink reference signal may be transmitted to the at least one device based on the sidelink resource.

In an embodiment, the logical slot index may be related to a slot set included in a resource pool.

In an embodiment, the slot set included in the resource pool may not include a slot for a sidelink-synchronization signal block (S-SSB), a slot excluded from the resource pool based on a sidelink start symbol and a number of sidelink symbols, and a slot excluded based on a bitmap.

In an embodiment, the logical slot index may be related to the slot set included in the resource pool in a system frame number (SFN) cycle.

In an embodiment, generating the sequence may include: determining a random seed value for the generation of the sequence, based on the logical slot index; and generating the sequence related to the sidelink reference signal, based on the random seed value.

In an embodiment, the sequence may be at least one of a PSSCH demodulation reference signal (DMRS) sequence, a PSCCH DMRS sequence, a sidelink channel state information-reference signal (SL CSI-RS) sequence, or a physical PSFCH cyclic shift hopping sequence.

In an embodiment, a random seed value for the generation of the PSSCH DMRS sequence may be determined based on at least one of the logical slot index, a PSCCH cyclic redundancy check (CRC) sequence related to the PSSCH or an orthogonal frequency division multiplexing (OFDM) symbol.

In an embodiment, a random seed value for the generation of the PSCCH DMRS sequence may be determined based on at least one of the logical slot index, a parameter value configured for each resource pool or an OFDM symbol.

In an embodiment, a random seed value for the generation of the SL CSI-RS sequence may be determined based on at least one of a PSCCH CRC sequence triggering an SL CSI-RS or an OFDM symbol index.

In an embodiment, a random seed value for the generation of the PSFCH cyclic shift hopping sequence may be determined based on at least one of the logical slot index, an identification (ID) related to a PSFCH cyclic shift hopping or an OFDM symbol index.

According to an embodiment of the present disclosure, a first device for performing wireless communication may be proposed. The first device may comprise: one or more memories storing instructions; one or more transceivers; and one or more processors connected to the one or more memories and the one or more transceivers, wherein the one or more processors execute the instructions to: transmit, to at least one device, at least one physical sidelink control channel (PSCCH); transmit, to the at least one device, data through at least one physical sidelink shared channel (PSSCH) related to the at least one PSCCH; determine a plurality of physical sidelink feedback channel (PSFCH) resources for receiving a plurality of sidelink hybrid automatic repeat request (HARQ) feedbacks related to the data, based on an index of a slot related to the at least one PSSCH and an index of a subchannel; and receive, from the at least one device, at least one HARQ feedback related to the data based on at least one PSFCH resource among the plurality of PSFCH resources, wherein the at least one PSCCH and the at least one PSSCH may be transmitted to the at least one device based on at least one first resource pool for a transmission, wherein the plurality of PSFCH resources may be determined within at least one second resource pool for a reception, and wherein connection information between the at least one first resource pool and the at least one second resource pool may be configured to the first device.

According to an embodiment of the present disclosure, a device (of a chip(set)) adapted to control a first user equipment (UE) may be proposed. The device may comprise: one or more processors; and one or more memories operably connectable to the one or more processors and storing instructions, wherein the one or more processors execute the instructions to: transmit, to at least one UE, at least one physical sidelink control channel (PSCCH); transmit, to the at least one UE, data through at least one physical sidelink shared channel (PSSCH) related to the at least one PSCCH; determine a plurality of physical sidelink feedback channel (PSFCH) resources for receiving a plurality of sidelink hybrid automatic repeat request (HARQ) feedbacks related to the data, based on an index of a slot related to the at least one PSSCH and an index of a subchannel; and receive, from the at least one UE, at least one HARQ feedback related to the data based on at least one PSFCH resource among the plurality of PSFCH resources, wherein the at least one PSCCH and the at least one PSSCH may be transmitted to the at least one UE based on at least one first resource pool for a transmission, wherein the plurality of PSFCH resources may be determined within at least one second resource pool for a reception, and wherein connection information between the at least one first resource pool and the at least one second resource pool may be configured to the first UE.

In one example, the first UE in the above embodiment may represent the first device described throughout the present disclosure. In one example, the at least one processor and the at least one memory in the device for controlling the first UE may be implemented as separate sub-chips, or at least two or more components may be implemented through one sub-chip.

According to an embodiment of the present disclosure, a non-transitory computer-readable storage medium storing instructions (or indications) may be proposed. The instructions, when executed, may cause a first device to: transmit, to at least one device, at least one physical sidelink control channel (PSCCH); transmit, to the at least one device, data through at least one physical sidelink shared channel (PSSCH) related to the at least one PSCCH; determine a plurality of physical sidelink feedback channel (PSFCH) resources for receiving a plurality of sidelink hybrid automatic repeat request (HARQ) feedbacks related to the data, based on an index of a slot related to the at least one PSSCH and an index of a subchannel; and receive, from the at least one device, at least one HARQ feedback related to the data based on at least one PSFCH resource among the plurality of PSFCH resources, wherein the at least one PSCCH and the at least one PSSCH may be transmitted to the at least one device based on at least one first resource pool for a transmission, wherein the plurality of PSFCH resources may be determined within at least one second resource pool for a reception, and wherein connection information between the at least one first resource pool and the at least one second resource pool may be configured to the first device.

Figure 13:
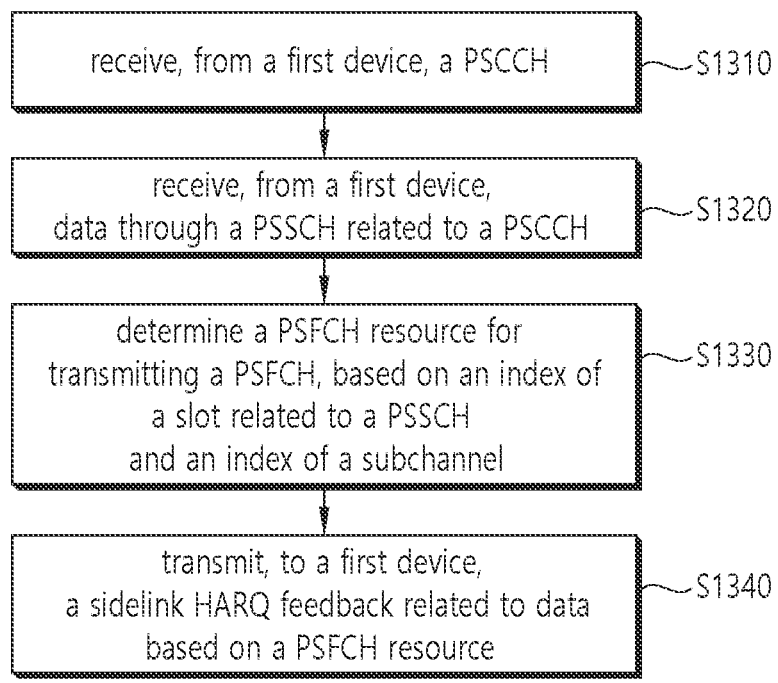
FIG. 13 is a flowchart showing a method for a second device to perform sidelink communication according to an embodiment of the present disclosure.

FIG. 13 is a flowchart showing a method for a second device to perform sidelink communication according to an embodiment of the present disclosure.

Operations disclosed in the flowchart of FIG. 13 may be performed in combination with various embodiments of the present disclosure. In one example, the operations disclosed in the flowchart of FIG. 13 may be performed based on at least one of the devices shown in FIGS. 14 to 19. In one example, the second device of FIG. 13 may correspond to the second wireless device 200 of FIG. 15 described later, and the first device may correspond to the first wireless device 100 of FIG. 15. In another example, the second device of FIG. 13 may correspond to the first wireless device 100 of FIG. 15 described later, and the first device may correspond to the second wireless device 200 of FIG. 15.

In step S1310, a second device according to an embodiment may receive, from a first device, a PSCCH.

In step S1320, a second device according to an embodiment may receive, from the first device, data through a PSSCH related to the PSCCH.

In step S1330, a second device according to an embodiment may determine a PSFCH resource for transmitting a PSFCH, based on an index of a slot related to the PSSCH and an index of a subchannel.

In step S1340, a second device according to an embodiment may transmit, to the first device, a sidelink HARQ feedback related to the data based on the PSFCH resource.

In an embodiment, the PSCCH and the PSSCH may be received from the first device based on at least one first resource pool for a reception.

In an embodiment, the PSFCH resource may be determined within at least one second resource pool for a transmission.

In an embodiment, connection information between the at least one first resource pool and the at least one second resource pool may be configured to the second.

In an embodiment, it may be determined that a plurality of resource pools with the same frequency resource configuration, a plurality of resource pools with the same PSCCH configuration, a plurality of resource pools with the same PSSCH configuration or a plurality of resource pool with the same PSFCH configuration does not exist, by the second device.

In an embodiment, a sequence related to a sidelink reference signal may be generated based on a logical slot index, by the first device.

In an embodiment, the sequence may be mapped to a sidelink resource, by the first device.

In an embodiment, the sidelink reference signal may be transmitted from the first device to the at least one device based on the sidelink resource.

In an embodiment, the logical slot index may be related to a slot set included in a resource pool, and the slot set included in the resource pool may not include a slot for a sidelink-synchronization signal block (S-SSB), a slot excluded from the resource pool based on a sidelink start symbol and a number of sidelink symbols, and a slot excluded based on a bitmap.

In an embodiment, the logical slot index may be related to the slot set included in the resource pool in a system frame number (SFN) cycle.

In an embodiment, generating the sequence may include: determining a random seed value for the generation of the sequence, based on the logical slot index; and generating the sequence related to the sidelink reference signal, based on the random seed value.

In an embodiment, the sequence may be at least one of a PSSCH demodulation reference signal (DMRS) sequence, a PSCCH DMRS sequence, a sidelink channel state information-reference signal (SL CSI-RS) sequence, or a physical PSFCH cyclic shift hopping sequence.

In an embodiment, a random seed value for the generation of the PSSCH DMRS sequence may be determined based on at least one of the logical slot index, a PSCCH cyclic redundancy check (CRC) sequence related to the PSSCH or an orthogonal frequency division multiplexing (OFDM) symbol.

In an embodiment, a random seed value for the generation of the PSCCH DMRS sequence may be determined based on at least one of the logical slot index, a parameter value configured for each resource pool or an OFDM symbol.

In an embodiment, a random seed value for the generation of the SL CSI-RS sequence may be determined based on at least one of a PSCCH CRC sequence triggering an SL CSI-RS or an OFDM symbol index.

In an embodiment, a random seed value for the generation of the PSFCH cyclic shift hopping sequence may be determined based on at least one of the logical slot index, an identification (ID) related to a PSFCH cyclic shift hopping or an OFDM symbol index.

According to an embodiment of the present disclosure, a second device for performing wireless communication may be proposed. The second device may comprise: one or more memories storing instructions; one or more transceivers; and one or more processors connected to the one or more memories and the one or more transceivers, wherein the one or more processors execute the instructions to: receive, from a first device, a PSCCH; receive, from the first device, data through a PSSCH related to the PSCCH; determine a PSFCH resource for transmitting a PSFCH, based on an index of a slot related to the PSSCH and an index of a subchannel; and transmit, to the first device, a sidelink HARQ feedback related to the data based on the PSFCH resource, wherein the PSCCH and the PSSCH may be received from the first device based on at least one first resource pool for a reception, w % herein the PSFCH resource may be determined within at least one second resource pool for a transmission, and wherein connection information between the at least one first resource pool and the at least one second resource pool may be configured to the second.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
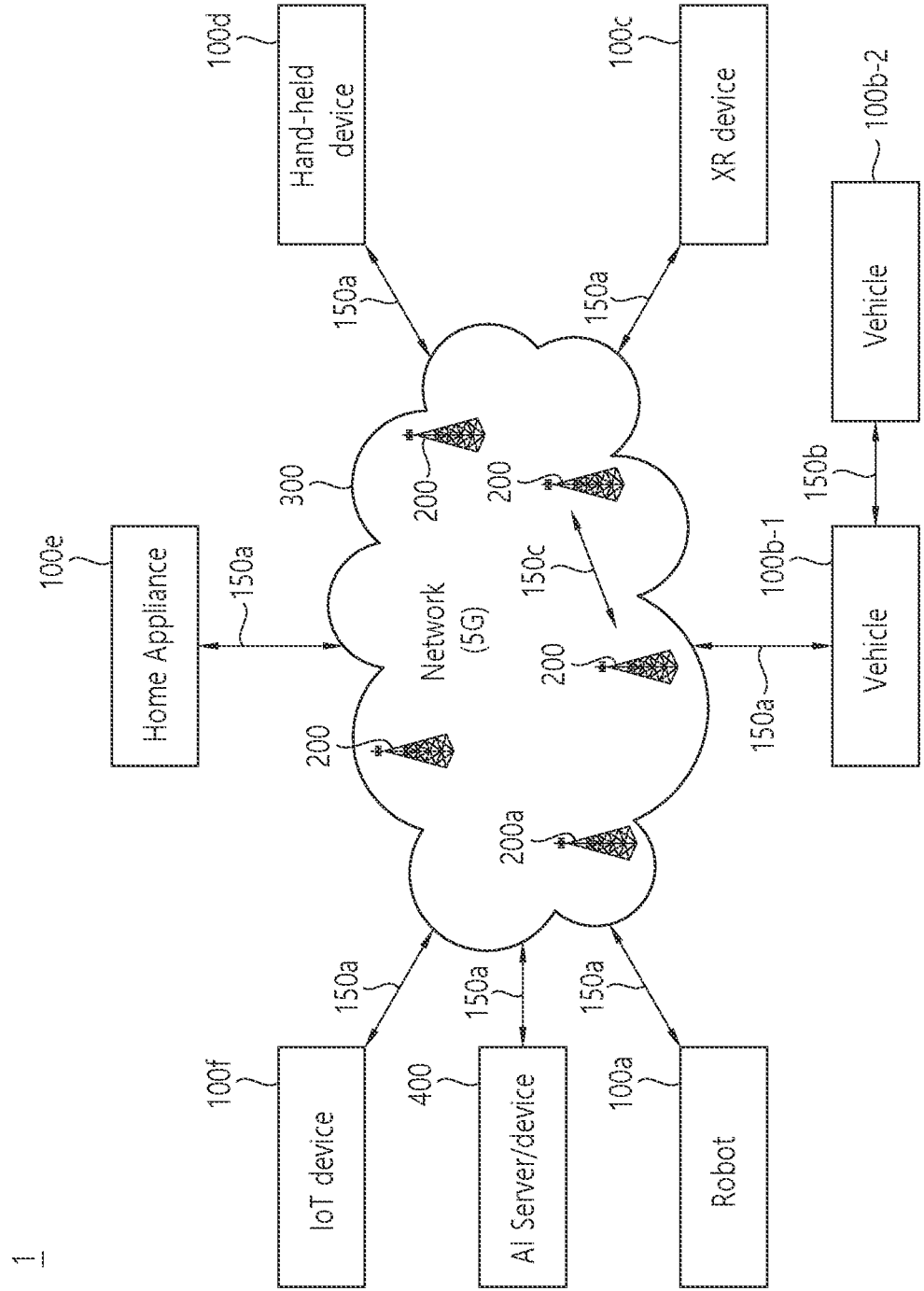
FIG. 14 shows a communication system 1, in accordance with an embodiment of the present disclosure.

FIG. 14 shows a communication system 1, in accordance with an embodiment of the present disclosure.

Referring to FIG. 14, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
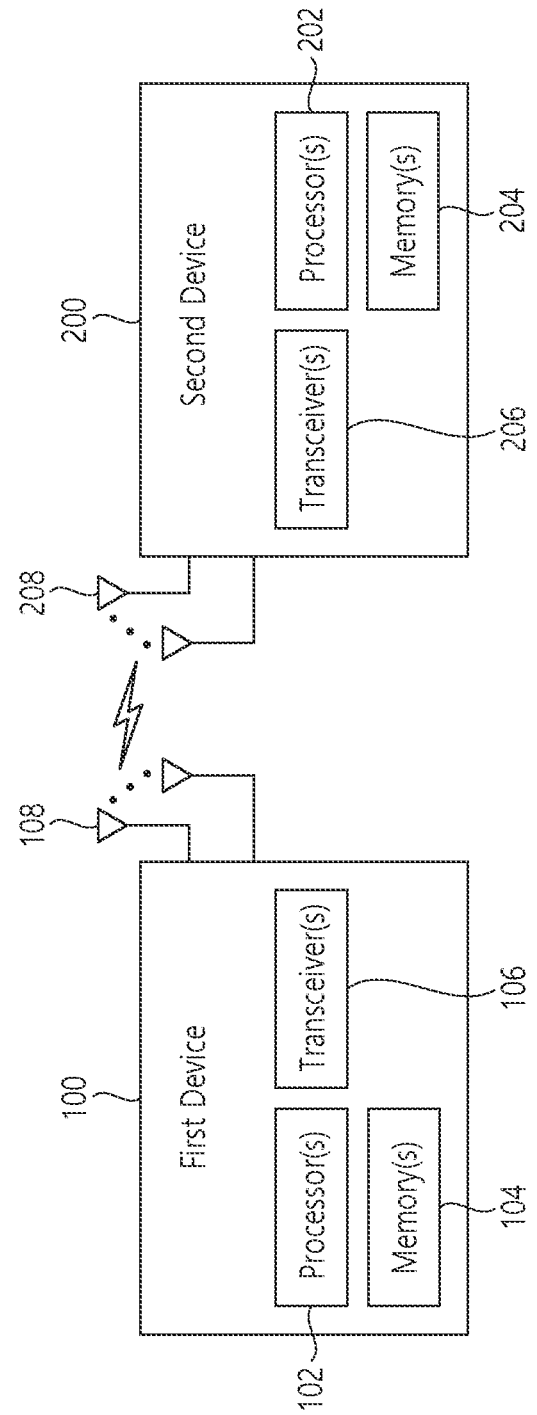
FIG. 15 shows wireless devices, in accordance with an embodiment of the present disclosure.

FIG. 15 shows wireless devices, in accordance with an embodiment of the present disclosure.

Referring to FIG. 15, a first wireless device 100 and a second wireless device 200 may transmit radio signals through a variety of RATs (e.g., LTE and NR). Herein, (the first wireless device 100 and the second wireless device 200) may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
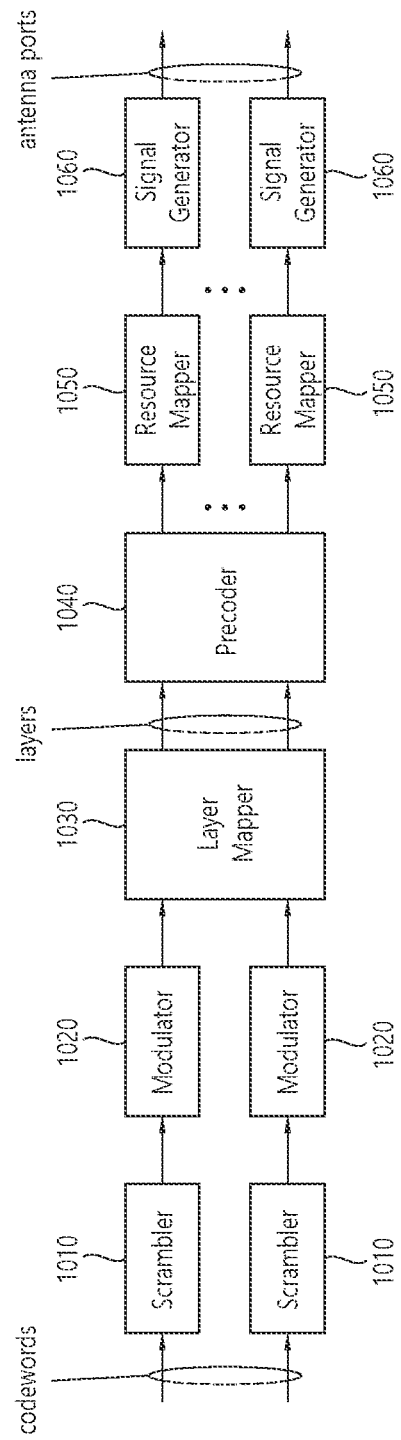
FIG. 16 shows a signal process circuit for a transmission signal, in accordance with an embodiment of the present disclosure.

FIG. 16 shows a signal process circuit for a transmission signal, in accordance with an embodiment of the present disclosure.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 17:
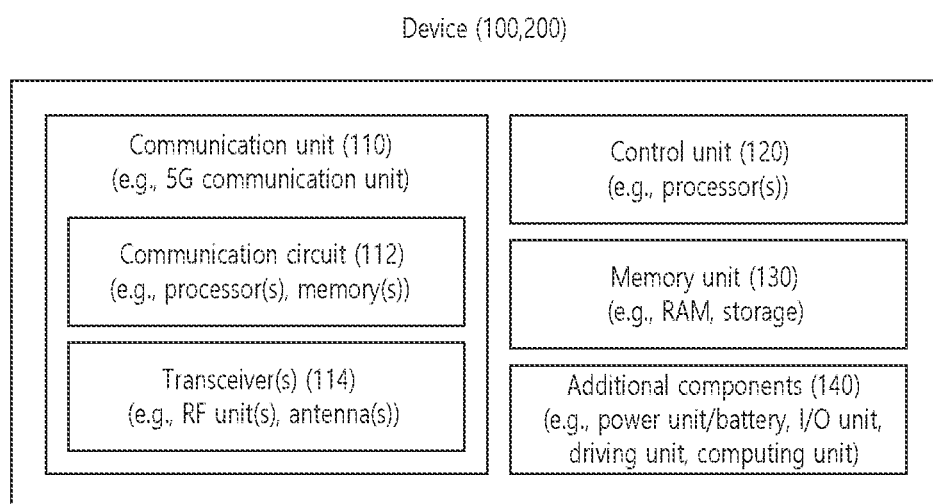
FIG. 17 shows another example of a wireless device, in accordance with an embodiment of the present disclosure.

FIG. 17 shows another example of a wireless device, in accordance with an embodiment of the present disclosure.

The wireless device may be implemented in various forms according to a use-case/service (refer to FIG. 14).

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (000f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Figure 18:
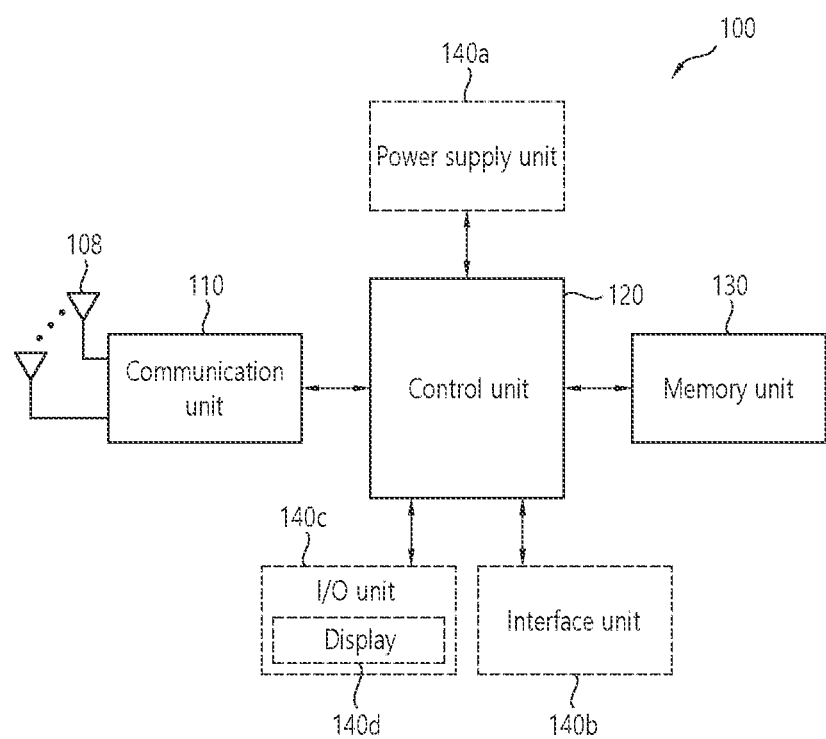
FIG. 18 shows a hand-held device, in accordance with an embodiment of the present disclosure.

FIG. 18 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 19 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 19, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, sidelink communication, the method comprising:
    transmitting, to at least one device, at least one physical sidelink control channel (PSCCH);
    transmitting, to the at least one device, data through at least one physical sidelink shared channel (PSSCH) related to the at least one PSCCH;
    determining a plurality of physical sidelink feedback channel (PSFCH) resources for receiving a plurality of sidelink hybrid automatic repeat request (HARQ) feedbacks related to the data, based on an index of a slot related to the at least one PSSCH and an index of a subchannel;
    receiving, from the at least one device, at least one HARQ feedback related to the data based on at least one PSFCH resource among the plurality of PSFCH resources;
    generating a sequence of a sidelink reference signal related to the at least one PSSCH, based on a logical slot index related to the at least one PSSCH; and
    mapping the sequence to a sidelink resource,
    wherein the at least one PSCCH and the at least one PSSCH are transmitted to the at least one device based on at least one first resource pool for a transmission,
    wherein the plurality of PSFCH resources are determined within at least one second resource pool for a reception,
    wherein connection information between the at least one first resource pool and the at least one second resource pool is configured to the first device,
    wherein the logical slot index is related to the slot set included in the at least one first resource pool in a system frame number (SFN) cycle,
    wherein the sidelink reference signal is transmitted to the at least one device based on the sidelink resource, and
    wherein the logical slot index is related to a slot set included in the at least one first resource pool.

2. The method of claim 1, wherein it is determined that a plurality of resource pools with the same frequency resource configuration, a plurality of resource pools with the same PSCCH configuration, a plurality of resource pools with the same PSSCH configuration or a plurality of resource pool with the same PSFCH configuration does not exist, by the first device.

3. The method of claim 1, wherein generating the sequence includes:
    determining a random seed value for the generation of the sequence, based on the logical slot index; and
    generating the sequence related to the sidelink reference signal, based on the random seed value.

4. The method of claim 1, wherein the sequence is at least one of a PSSCH demodulation reference signal (DMRS) sequence, a PSCCH DMRS sequence, a sidelink channel state information-reference signal (SL CSI-RS) sequence, or a physical PSFCH cyclic shift hopping sequence.

5. The method of claim 4, wherein a random seed value for the generation of the PSSCH DMRS sequence is determined based on at least one of the logical slot index, a PSCCH cyclic redundancy check (CRC) sequence related to the PSSCH or an orthogonal frequency division multiplexing (OFDM) symbol.

6. The method of claim 4, wherein a random seed value for the generation of the PSCCH DMRS sequence is determined based on at least one of the logical slot index, a parameter value configured for each resource pool or an OFDM symbol.

7. The method of claim 4, wherein a random seed value for the generation of the SL CSI-RS sequence is determined based on at least one of a PSCCH CRC sequence triggering an SL CSI-RS or an OFDM symbol index.

8. The method of claim 4, wherein a random seed value for the generation of the PSFCH cyclic shift hopping sequence is determined based on at least one of the logical slot index, an identification (ID) related to a PSFCH cyclic shift hopping or an OFDM symbol index.

9. A first device for performing wireless communication, the first device comprising:
- one or more memories storing instructions;
- one or more transceivers; and
- one or more processors connected to the one or more memories and the one or more transceivers, wherein the one or more processors execute the instructions to:
- transmit, to at least one device, at least one physical sidelink control channel (PSCCH);
- transmit, to the at least one device, data through at least one physical sidelink shared channel (PSSCH) related to the at least one PSCCH;
- determine a plurality of physical sidelink feedback channel (PSFCH) resources for receiving a plurality of sidelink hybrid automatic repeat request (HARQ) feedbacks related to the data, based on an index of a slot related to the at least one PSSCH and an index of a subchannel;
- receive, from the at least one device, at least one HARQ feedback related to the data based on at least one PSFCH resource among the plurality of PSFCH resources;
- generate a sequence of a sidelink reference signal related to the at least one PSSCH, based on a logical slot index related to the at least one PSSCH; and
- map the sequence to a sidelink resource,
- wherein the at least one PSCCH and the at least one PSSCH are transmitted to the at least one device based on at least one first resource pool for a transmission,
- wherein the plurality of PSFCH resources are determined within at least one second resource pool for a reception,
- wherein connection information between the at least one first resource pool and the at least one second resource pool is configured to the first device,
- wherein the logical slot index is related to the slot set included in the at least one first resource pool in a system frame number (SFN) cycle,
- wherein the sidelink reference signal is transmitted to the at least one device based on the sidelink resource, and
- wherein the logical slot index is related to a slot set included in the at least one first resource pool.

10. A device configured to control a first user equipment (UE), the device comprising:
- one or more processors; and
- one or more memories operably connectable to the one or more processors and storing instructions, wherein the one or more processors execute the instructions to:
- transmit, to at least one UE, at least one physical sidelink control channel (PSCCH);
- transmit, to the at least one UE, data through at least one physical sidelink shared channel (PSSCH) related to the at least one PSCCH;
- determine a plurality of physical sidelink feedback channel (PSFCH) resources for receiving a plurality of sidelink hybrid automatic repeat request (HARQ) feedbacks related to the data, based on an index of a slot related to the at least one PSSCH and an index of a subchannel;
- receive, from the at least one UE, at least one HARQ feedback related to the data based on at least one PSFCH resource among the plurality of PSFCH resources;
- generate a sequence of a sidelink reference signal related to the at least one PSSCH, based on a logical slot index related to the at least one PSSCH; and
- map the sequence to a sidelink resource,
- wherein the at least one PSCCH and the at least one PSSCH are transmitted to the at least one UE based on at least one first resource pool for a transmission,
- wherein the plurality of PSFCH resources are determined within at least one second resource pool for a reception,
- wherein connection information between the at least one first resource pool and the at least one second resource pool is configured to the first UE,
- wherein the logical slot index is related to the slot set included in the at least one first resource pool in a system frame number (SFN) cycle,
- wherein the sidelink reference signal is transmitted to the at least one UE based on the sidelink resource, and
- wherein the logical slot index is related to a slot set included in the at least one first resource pool.

* * * * *